(12) United States Patent
Forutanpour et al.

(10) Patent No.: US 8,457,651 B2
(45) Date of Patent: Jun. 4, 2013

(54) DEVICE MOVEMENT USER INTERFACE GESTURES FOR FILE SHARING FUNCTIONALITY

(75) Inventors: Babak Forutanpour, Carlsbad, CA (US); Ted Gooding, San Diego, CA (US); David Bednar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 12/578,905

(22) Filed: Oct. 14, 2009

(65) Prior Publication Data

US 2011/0081923 A1 Apr. 7, 2011

Related U.S. Application Data

(60) Provisional application No. 61/248,249, filed on Oct. 2, 2009.

(51) Int. Cl.
*G06F 3/003* (2006.01)

(52) U.S. Cl.
USPC ....... 455/456.1; 455/41.2; 455/566; 345/156; 345/158; 709/232; 715/863

(58) Field of Classification Search
USPC .............. 455/41.2, 456.1–457, 566; 345/156, 345/158; 709/232; 715/863
See application file for complete search history.

(56) References Cited

U.S. PATENT DOCUMENTS

| | | | |
|---|---|---|---|
| 6,313,853 B1 | 11/2001 | Lamontagne et al. | |
| 7,427,926 B2 * | 9/2008 | Sinclair et al. | 340/4.2 |
| 7,479,949 B2 * | 1/2009 | Jobs et al. | 345/173 |
| 7,532,196 B2 * | 5/2009 | Hinckley | 345/156 |
| 7,725,077 B2 * | 5/2010 | Jung et al. | 455/41.2 |
| 7,751,834 B2 * | 7/2010 | Park et al. | 455/456.2 |
| 7,802,191 B2 | 9/2010 | Pettinati et al. | |
| 8,045,455 B1 * | 10/2011 | Agronow et al. | 370/229 |
| 8,077,157 B2 * | 12/2011 | Sengupta et al. | 345/173 |

(Continued)

FOREIGN PATENT DOCUMENTS

| | | |
|---|---|---|
| WO | 2005076542 A1 | 8/2005 |
| WO | 2008007175 A1 | 1/2008 |

OTHER PUBLICATIONS

Moore, Travis. "Mover Review," AppVee, <www.appvee.com/t/iphone-app-review-mover>, Oct. 14, 2009.

(Continued)

*Primary Examiner* — Lester Kincaid
*Assistant Examiner* — Steven Kelley
(74) *Attorney, Agent, or Firm* — Nicholas A. Cole

(57) ABSTRACT

Methods and devices provide a gesture activated file sharing functionality enabling users to share files with other nearby computing devices. The file sharing functionality may include establishing wireless links with nearby devices and determine their relative locations. The computing device may detect a file sharing motion of the computing device from accelerometers and transmit files to or request files from a nearby device in response. Base on motion parameters, e.g., direction, speed and/or shape, the computing device may identify a targeted device to which a file may be transmitted or from which a file may be requested. The computing device may request user verification of the identified device and send a request to transmit files to the targeted device. The computing devices may transmit files using networks and addresses provided over the device-to-device communication links.

41 Claims, 25 Drawing Sheets

U.S. PATENT DOCUMENTS

| | | | |
|---|---|---|---|
| 8,155,121 B2 * | 4/2012 | Gudan et al. | 370/392 |
| 8,200,246 B2 * | 6/2012 | Khosravy et al. | 455/456.3 |
| 8,312,392 B2 * | 11/2012 | Forutanpour et al. | 715/863 |
| 2004/0003133 A1 * | 1/2004 | Pradhan et al. | 709/318 |
| 2004/0203381 A1 * | 10/2004 | Cahn et al. | 455/41.2 |
| 2005/0198029 A1 * | 9/2005 | Pohja et al. | 707/8 |
| 2006/0256074 A1 | 11/2006 | Krum et al. | |
| 2006/0258289 A1 * | 11/2006 | Dua | 455/41.3 |
| 2007/0124503 A1 | 5/2007 | Ramos et al. | |
| 2007/0146347 A1 | 6/2007 | Rosenberg | |
| 2007/0268110 A1 * | 11/2007 | Little | 340/5.62 |
| 2008/0039212 A1 * | 2/2008 | Ahlgren et al. | 463/46 |
| 2008/0096519 A1 * | 4/2008 | Miegel | 455/404.2 |
| 2009/0017799 A1 * | 1/2009 | Thorn | 455/414.1 |
| 2010/0124949 A1 * | 5/2010 | Demuynck et al. | 455/569.1 |
| 2010/0167646 A1 * | 7/2010 | Alameh et al. | 455/41.2 |
| 2010/0257251 A1 * | 10/2010 | Mooring et al. | 709/216 |
| 2011/0083111 A1 * | 4/2011 | Forutanpour et al. | 715/863 |
| 2011/0312349 A1 * | 12/2011 | Forutanpour et al. | 455/466 |

OTHER PUBLICATIONS

International Search Report and Written Opinion of the International Searching Authority for PCT/US2010/050747, International Searching Authority—European Patent Office. Jan. 10, 2011.

* cited by examiner

DEVICE MOVEMENT USER INTERFACE GESTURES FOR FILE SHARING FUNCTIONALITY

RELATED APPLICATIONS

This application claims the benefit of priority to U.S. Provisional Patent Application No. 61/248,249 filed Oct. 2, 2009 entitled "User Interface Methods Providing File Sharing Functionality," the entire contents of which are hereby incorporated by reference. This application cross-references and fully incorporates by reference concurrently filed U.S. application Ser. No. 12/578,867, entitled "Device Movement User Interface Gestures for File Sharing Functionality."

FIELD OF THE INVENTION

The present invention relates generally to computer user interface systems and more particularly to a gesture based user interface for activating a file sharing function.

BACKGROUND

Personal electronic devices (e.g. cell phones, PDAs, laptops, gaming devices, etc.) provide users with increasing functionality and data storage. In addition to serving as personal organizers, personal electronic devices serve to store documents, photographs, videos, and music, and serve as portals to the Internet and electronic mail. These devices allow users to communicate with other users and share stored files, such as documents, pictures or videos with other mobile device users. Today, mobile devices allow users to share files by employing different methods such as emailing, texting (e.g., SMS), multimedia messaging service (MMS), and near field communication (NFC). However, these file sharing methods are limiting, cumbersome, and time consuming. Drafting and sending an email requires a large amount of typing. The sender must know and enter an email address before sending a message. To send SMS or MMS messages, senders must know the recipient phone number. To use the internet for uploading or downloading files, the users must know a URL and visit a website. To use NFC, the senders and recipients of files must be in very close proximity.

SUMMARY

The various aspects include methods for sharing files among computing devices, including activating a file sharing functionality, discovering nearby computing devices, establishing a wireless link with the discovered computing devices, determining locations of the discovered nearby computing devices, detecting a file sharing gesture based on accelerations of the computing device, identifying a targeted computing device based on the detected file sharing gesture, and transmitting a file sharing message to the targeted computing device. The wireless link may be established using a wireless technology selected from Bluetooth®, ZigBee®, Near Field Communication (NFC), wide-area-wireless IEEE 802.11 (WiFi), infrared (IrDA), and ultrasound. In an aspect, determining locations of the discovered nearby computing devices may include receiving location coordinates provided by Global Positioning System (GPS) receivers in each of the discovered nearby computing devices via the established wireless link, and transmitting the file sharing message to the targeted computing device may be accomplished using a wireless technology different from the wireless technology used to establish the wireless link. In an aspect, determining locations of the discovered nearby computing device may include determining a difference in arrival times of signals received from the discovered nearby computing devices using a first and second antennae, and using triangulation calculations based on the determined difference in arrival times of signals to determine a direction to each of the discovered nearby computing devices. In a further aspect, determining locations of the nearby discovered computing device may include receiving location coordinates provided by GPS receivers in each of the discovered nearby computing devices, and comparing the received location coordinates to location coordinates from a GPS receiver. In a further aspect, identifying the targeted computing device may include detecting accelerations of the computing device, calculating a velocity of the computing device based on the detected accelerations, calculating a ballistic trajectory based upon the calculated velocity, calculating a landing location where an object would land based on the calculated ballistic trajectory, and identifying a computing device located closest to the calculated landing location.

An aspect method may further include detecting accelerations of the computing device, determining whether the computing device is being moved along an elliptical path based upon the detected accelerations and determining a direction of rotation if the computing device is being moved along an elliptical path, in which transmitting a file sharing message includes transmitting a file to all nearby discovered computing devices if the computing device is being moved in a clockwise direction, and transmitting a request for files to all nearby discovered computing devices if the computing device is being moved in a counterclockwise direction. In a further aspect, transmitting a file sharing message includes transmitting a file to all nearby discovered computing devices if the computing device is being moved in a counterclockwise direction, and transmitting a request for files to all nearby discovered computing devices if the computing device is being moved in a clockwise direction. In a further aspect, transmitting a file sharing message may include transmitting a selected file to the targeted computing device, and the method may further include transmitting a request to transmit the file to the targeted computing device, and receiving a response from the targeted computing device including access data specifying an address to which the file should be transmitted, in which transmitting the file to the targeted computing device may include determining a wireless communication link over which the file should be transmitted based upon the address specified in the received access data, and transmitting the file to the address via the determined wireless communication link. In a further aspect, the request to transmit the file to the target computing device may be accomplished using the established wireless link, and the determined wireless communication link used to transmit the file uses a wireless technology that is different than the established wireless link technology. In a further aspect, transmitting a file sharing message may include transmitting a selected file to the targeted computing device, and the method may further include displaying a prompt for a user verification of the targeted computing device, and determining whether a user input indicates user verification of the targeted computing device, in which transmitting the file to the targeted computing device may be accomplished if the user input indicates user verification of the targeted computing device. In a further aspect, displaying a prompt for a user verification of the targeted computing device may include receiving a user identifier from discovered computing devices via the established wireless link, using the received user identifier to obtain an image from a contact database, and displaying an obtained image as the prompt for the user verification of the targeted computing device.

In another aspect, the method may further include displaying a radar map image including graphical indicators for the determined relative locations of the discovered nearby computing devices. In a further aspect, transmitting a file sharing message comprises transmitting a message requesting the targeted computing device to transmit a file. In another aspect, the method may further include transmitting access data to the targeted computing device in which the access data includes an address to which the requested file should be transmitted.

Another aspect is a mobile device that includes a processor, a display coupled to the processor, accelerometers coupled to the processor, a memory coupled to the processor, and at least one wireless transceiver coupled to the processor, in which the processor is configured with processor-executable instructions to perform operations of the various aspect methods.

Another aspect is a mobile device that includes means for accomplishing the functions involved in the operations of the various aspect methods.

Another aspect is a computer program product including a computer-readable medium storing computer-executable instructions including at least one instruction for accomplishing the processes of involved in the various aspect methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
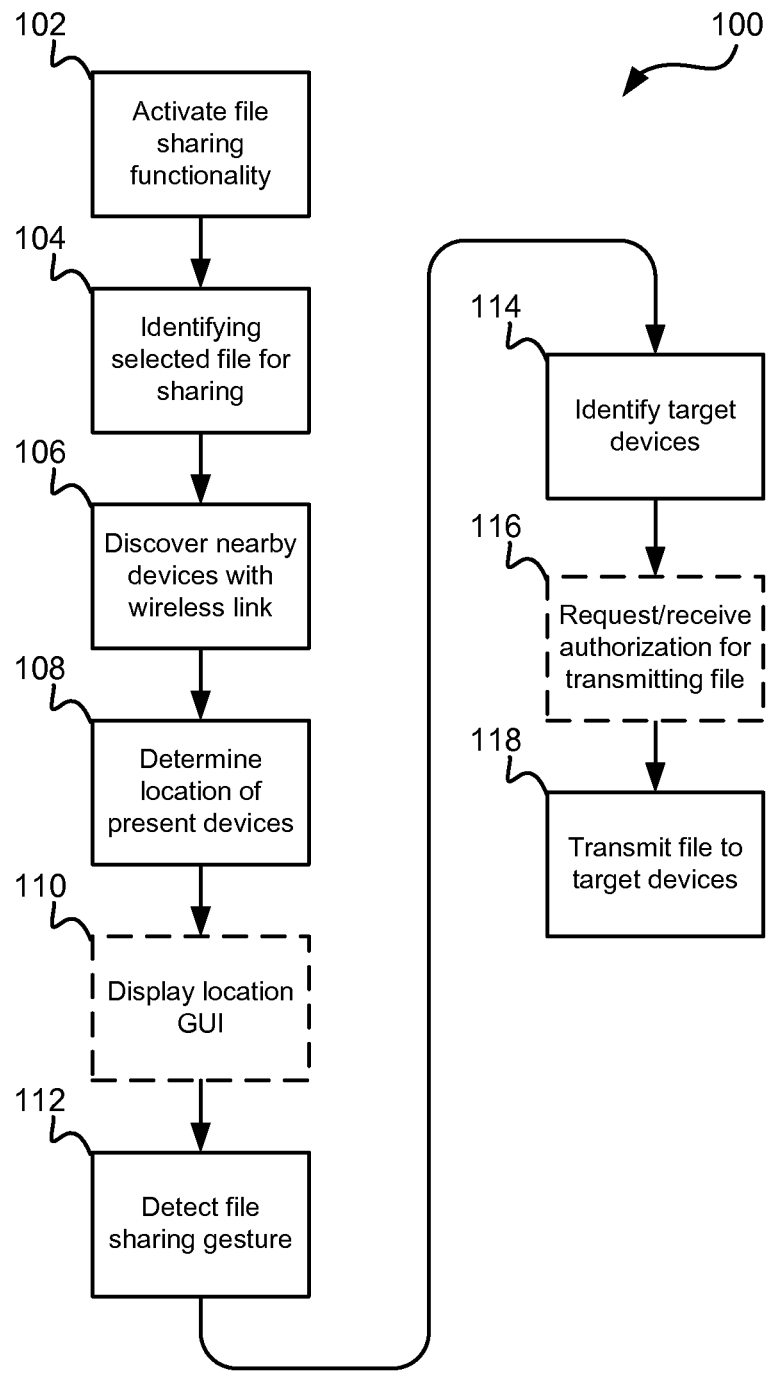
FIG. 1 is a process flow diagram of an aspect method for implementing file sharing functionality based on user gestures.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, a "touchscreen" is a touch sensing input device or a touch sensitive input device with an associated image display. As used herein, a "touchpad" is a touch sensing input device without an associated image display. A touchpad can be implemented on any surface of an electronic device outside the image display area. Touchscreens and touchpads are generically referred to herein as a "touch surface." Touch surfaces may be integral parts of an electronic device, such as a touchscreen display, or may be a separate module, such as a touchpad, that can be coupled to the electronic device by a wired or wireless data link. The terms touchscreen, touchpad, and touch surface may be used interchangeably hereinafter.

As used herein, the terms "personal electronic device," "computing device" and "portable computing device" refer to any one or all of cellular telephones, personal data assistants (PDA's), palm-top computers, notebook computers, personal computers, wireless electronic mail receivers, cellular telephone receivers (e.g., the Blackberry® and Treo® devices), multimedia Internet enabled cellular telephones (e.g., the Blackberry Storm®), and similar electronic devices which include a programmable processor, memory, a transceiver for communicating with a network (e.g., a wireless network), and a connected or integral touch surface or other pointing device (e.g., a computer mouse). In an example aspect used to illustrate various aspects of the present invention, the electronic device is a cellular telephone including an integral touchscreen display. However, this aspect is present merely as one example implementation of the various aspects, and as such is not intended to exclude other possible implementations of the subject matter recited in the claims.

As used herein a "touch event" refers to a detected user input on a touch surface which may include information regarding location or relative location of the touch. For example, on a touchscreen or touchpad user interface device, a touch event refers to the detection of a user touching the device and may include information regarding the location on the device being touched.

With the advances in electronic technologies, computing devices are increasingly used to store and share personal data. Pictures, movies, emails, URLs, applications, contacts, and text messages are examples of data that users store and share with other computing devices. A variety of available file sharing methods are currently available which allow users to share files via a variety of wired and wireless communication networks. For example, emails are delivered in Internet Protocol (IP) datagrams via wired and wireless (e.g., WiFi and cellular data networks) to email addresses; Short Messaging Service (SMS) and Multimedia Messaging Service (MMS) messages are delivered via cellular telephone networks to device phone numbers; downloaded files and webpages from websites accessed at an IP address are delivered via wired and wireless networks; data can be exchanged between two computing devices via short range Bluetooth wireless communication links; and data can be communicated over very short distances using Near Field Communication (NFC) technologies.

Despite the variety of communication links available to transfer information among computing devices, current user interface systems require users to enter information that has no perceptual connection with the physical world, such as email addresses, telephone numbers or IP addresses. Those more intuitive interfaces, such as allowing users to share files by tracing a finger gesture on the touchscreen of a computing device as provided on the Bump and Move file sharing applications for the Apple iPhone®, require that all communicating devices be within the same network and require a server and internet connection to help pair sender and receiver. In sum, known methods for sharing files among computing devices are either not intuitive, or are limited to particular networks.

The methods and systems of the various aspects allow users to be cognitively and physically involved with communicating data (i.e., sharing files) by linking the file transfer functionality to motions that have intuitive meaning. In the natural world, delivery of objects occurs when cognitive intention and physical effort combine to physically deliver an object from one person to another. In the various aspects, the processes of transmitting files are tied to user physical actions which mimic actions that would be implemented if the files of nearby computing devices were physical objects. Computing devices may gather information about the presence and relative location of other nearby computing devices. Such presence data may include the location parameters (e.g., GPS coordinates) and access data (e.g., telephone number or email address) of nearby computing devices. Similar to how one passes a set of keys to another by picking up the keys and tossing or dropping them into the other person's hands, the various aspects allow users to select a file, determine the physical location of the targeted computing devices, and transmit the file to other computing devices using an intuitive physical action such as a mock throwing motion with the computing device. Similarly, the various aspects may allow a computing device to request transmission of files from another computing device by using a mock lasso movement of the computing device or other intuitive motion.

FIG. 1 illustrates a process flow diagram of a method 100 for implementing file sharing functionality in response to intuitive user gestures according to the various aspects. In method 100, a computing device may be configured to enable device users to share files with another computing device by activating a file sharing functionality at block 102. This file sharing functionality may be an application or operating system function that includes a set of processes implemented in processor-executable instructions on the computing device, which provides a user interface for file sharing, detects and interprets user movement gestures, determines the file to be shared and the destination, negotiates the file transfer with the receiving device, and transmits the file via an appropriate and available communication network. This functionality includes the processes of the aspects described herein, as well as well known processes, such as the implementation of appropriate data communication protocols. For ease of reference, an application or operating system function that enables or encompasses such processes is referred to herein as the file sharing functionality. At block 102 the computing device may activate the file sharing functionality, either automatically or in response to a specific user input. For example, the file sharing functionality may be activated automatically when a file is accessed by a user, thereby enabling the user to share the accessed file if desired. As another example, a user may manually activate the file sharing functionality by pressing a button or by entering a particular touch gesture, as described in more detail below with reference to FIG. 12.

In method 100 at block 104, the computing device implementing the file sharing functionality may enable the user to identify a file to be shared with another computing device. For example, the user interface may present a menu, list, or thumbnail display of files from which the user can select a file by, for example, touching it on a touchscreen display. Any known method of selecting a file may be used.

In method 100 at block 106, activation of the file sharing functionality may prompt the computing device to discover nearby computing devices using a wireless communication link by using, for example, Bluetooth® or ZigBee® wireless communication technologies. Depending on the type of wireless communication technology used to establish a wireless communication link with nearby computing devices, the computing device may discover other computing devices located at relatively close distances. For example, a computing device configured with a Bluetooth® transceiver may be configured to discover the presence of like-equipped computing devices located within about 100 meters, depending on the Bluetooth power class employed. Bluetooth® is a standard communications protocol primarily designed for low power consumption, short range (power-class-dependent: 1 meter, 10 meters, 100 meters) communications between devices equipped with low-cost transceiver microchips. Bluetooth® makes it possible for these devices to communicate with each other when they are within range. As is well known, the Bluetooth® communication protocol, like other short range wireless communication protocols (e.g., the ZigBee® and NFC protocols), provides for automatic device discovery and link establishment signaling. This automatic link establishment capability includes a set of transmissions at a predefined frequency and with a predefined format that are recognized by receiving devices, prompting the receiving devices to reply with signals that enable the two devices to commence wireless link establishment handshaking communications to establish a wireless communication link between them. The various aspects leverage such automatic device discovery and wireless communication link establishment capabilities to enable a computing device to locate other nearby computing devices. Since the computing devices use radio frequency (RF) communications to discover each other, the two computing devices do not have to be in line of sight of to enable file transfers between them.

As part of discovering nearby computing devices, at block 108 the computing device may receive the locations of the nearby computing devices using different methods. In one aspect, the computing device may determine the location of nearby computing devices in block 108 by receiving precise latitude and longitude coordinates of the nearby computing devices from Global Positioning System (GPS) receivers within the computing devices. In another aspect, the computing device may determine the relative location of the nearby computing devices at block 108 by using signal strength and time-of-arrival information from received RF signals and triangulation calculations, as described more fully below with reference to FIG. 15.

Figure 3:
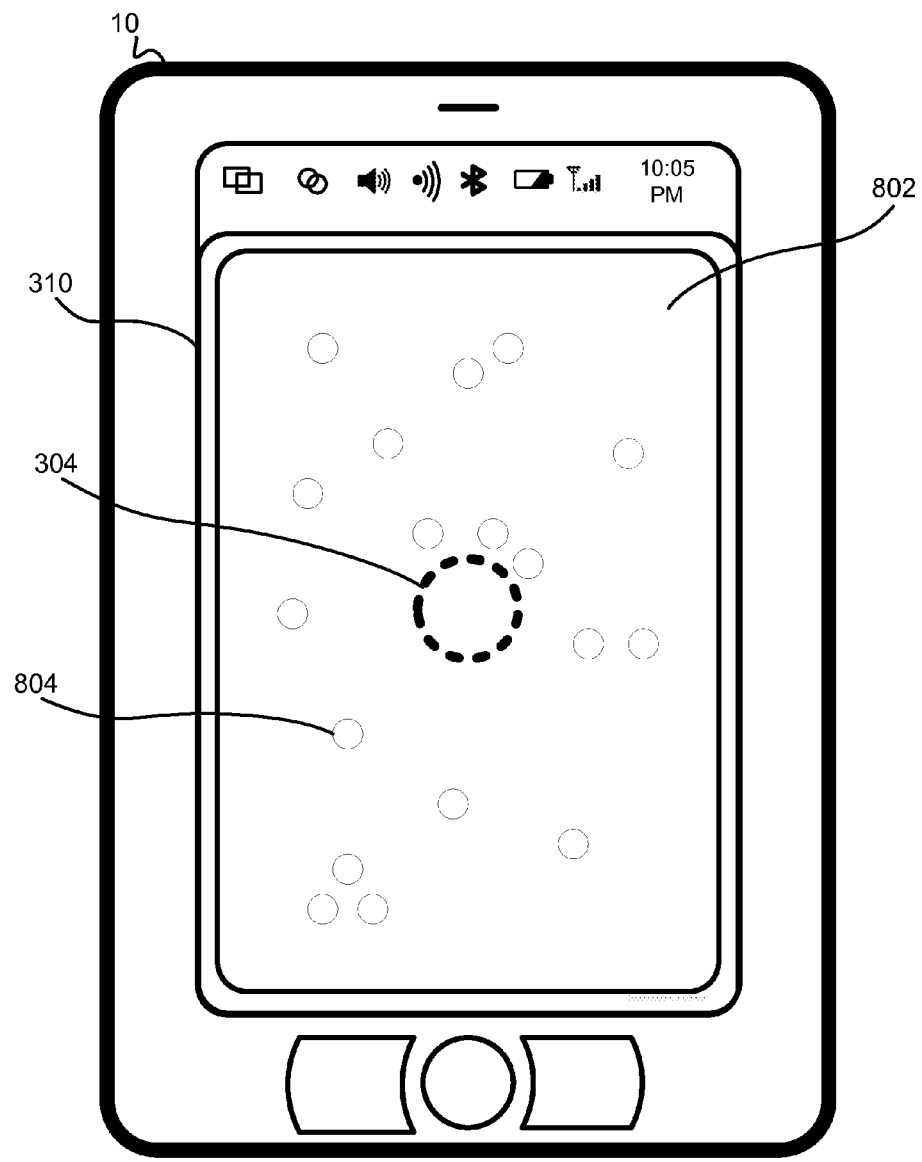
FIG. 3 is a frontal view of a portable computing device illustrating a display including a radar map according to an aspect.

Optionally, at block 110, the computing device may map the locations of nearby computing devices and display the map in a display GUI once the relative locations of nearby computing devices are determined. The mapped locations of nearby computing devices may be displayed relative to the position of the computing device, such as in a radar map type display showing locations of nearby computing devices with graphical indicators (e.g., dots). An example of such a radar map display is shown in FIG. 3, which is described more fully below.

Once the file sharing functionality is activated and the locations of nearby computing devices are determined, at block 112 the computing device may determine whether a user wishes to share the selected file with another computing device by detecting a file transfer motion gesture. As described more fully herein, the computing device may be configured to detect and recognize a file transfer motion gesture based upon accelerometer data indicating a recognizable movement of the computing device.

Movement file transfer gestures may include, for example, mock throwing gestures, and clockwise and counterclockwise elliptical swirling gestures. Each of these file transfer gestures may be used to initiate transmission of data between computing devices as described in more details below with reference to FIGS. 4-10. For example, to share a file with another device, a user may move the computing device as if throwing it to the intended recipient of the file, a gesture that the computing device can recognize and process in order to identify the intended recipient computing device and initiate the transmission of the selected file.

At block 114 the computing device may identify targeted particular nearby computing device to which the user intends to send the selected file based upon information regarding the file transfer motion gesture, such as its direction and speed, and the relative location of nearby computing devices.

A computing device may be equipped with different sensors that can provide information that the device processor can use to calculate a trajectory or direction to identify the nearby computing devices that are to receive the selected file. For example, the computing device may include a compass to determine the orientation of the computing device with respect to the direction of a gesture. The computing device may include a set of accelerometers that can provide gravity vector data and acceleration data that the device processor can use to calculate a ballistic path and impact point of a mock throwing movement to determine an intended recipient of a file from a mock throwing gesture.

Optionally, at block 116 the computing device may be configured to prompt a user to confirm or authorize sharing the selected file with the targeted computing device. Also at block 116 the computing device may receive a message from the targeted recipient computing device, indicating whether the device will accept the file. Providing a verification and/or authorization process enables a user to confirm that the intended recipient's computing device has been selected, and enables intended recipients to decide whether to accept a file. Such measures may prevent transmission of files to the wrong computing device, and give recipient users control over the files that are transmitted to their computing devices. Instead of transmitting an authorization message, a targeted computing device may simply provide the requesting computing device with communication access data, such as Bluetooth identification, email address, or telephone number which can be used to complete the file transfer.

On the receiver side, authorization to receive a file may be enabled in a variety of ways. For example, a user may configure their computing device to always accept file transmissions from nearby computing devices. In another example, when a computing device receives a request to receive a file, the device processor may generate a prompt that alerts the device's user of the pending file transfer request and, optionally, the identity of the user sending the file and file name or type. An intended recipient user may then press a key or virtual key on the GUI to either accept or decline transfer of the file. In a further example, a user may set an authorization state that automatically accepts file sharing with certain known computing devices, such as those in a contact database, and requires user input to authorize file transfers from unknown computing devices. Such file transfer acceptance criteria may be defined in custom settings based on their preferences.

As part of discovering nearby computing devices at block 106 or receiving authorization to transmit files at block 116, the recipient computing device may provide access data that the transmitting computing device uses to accomplish a file transmission. Such access data may include an address of the recipient computer device, such as a telephone number (for SMS or MMS messages), email address, or IP address that the transmitting computing device can use to address the file for transmission. The access data may also identify a preferred communication method and communication network to be used for transmitting the file. For example, the receiving device may identify that the file may be transmitted via a direct communication link, such as an NFC, Bluetooth or WiFi direct communication link. Alternatively, the receiving device may identify that the file may be transmitted via an indirect communication network, such as a cellular data communication link or WiFi communication link to a server (e.g., an e-mail server). Additionally as part of the discovery and/or authorization processes (blocks 106 and/or 116) the transmitting and intended recipient computing devices may negotiate a mutually acceptable communication network to use for the file transfer.

Once the intended recipient computing device is identified, and transfer of the file is verified and/or authorized, at block 118 the computing device may transmit the selected file to the targeted device using identified access data and communication network.

Figure 2A:
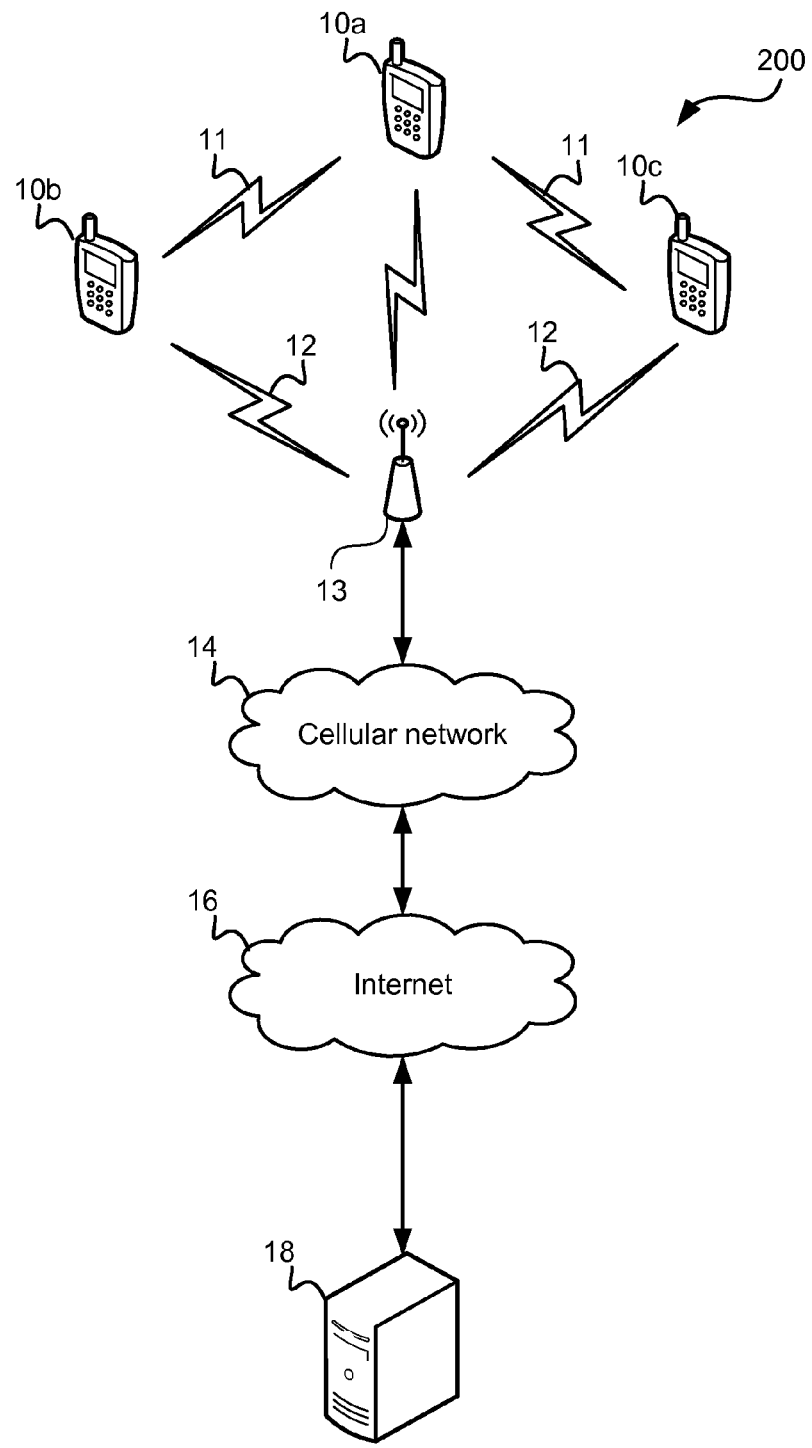
FIG. 2A is a communication network component diagram suitable for use with the various aspects.

As shown in the communication network diagram of FIG. 2A, a communication network 200 may include computing devices 10a-10c that are configured to communicate with one another using a short range wireless communication link 11, such as a Bluetooth® wireless communication link. The computing devices 10a-10c can also communicate with a cellular communication network 14 via wireless communication links 12 between the devices and a cellular base station 13. Such a cellular communication network 14 may be a cellular telephone network, or a WiFi hotspot network coupled to the Internet 16. Depending on the type of files, the short range wireless communication link 11 available, and the access data provided, the computing devices 10a-10c may share files directly from one device to the other, through device-to-device wireless links (e.g., Bluetooth® or NFC communication link), and/or indirectly, such as via a cellular system (SMS or MMS) or via a wireless link to the Internet (e.g., via a webpage or an email server 18). For example, the computing devices 10a-10c which can establish Bluetooth® links with one another may exchange access data and files directly using a Bluetooth® communication link. As another example, computing devices 10a-10c may exchange access data via Bluetooth® links, and when access data specifies a telephone number for transmitting a file, the computing devices 10a-10c may transmit a selected file as an SMS or MMS message transmitted via a cellular telephone access point 12 to a cellular network 14. The cellular network relays the SMS/MMS message to the recipient device via the cellular access point 12. When access data exchanged between computing devices 10a-10c includes an email address, a transmitting computing device 10a may transmit a selected file via email by transmitting the email to an email server 18 via the cellular access point 12 to the cellular network 14, which relays the email message via the Internet 16. The email server 18 may receive the email, identify the intended recipient, and deliver it to the intended computing device 10b or 10c via the Internet 16 to the cellular network 14 which transmits it via the cellular access point 12.

While the foregoing examples described transmitting files via a cellular telephone network, messages may similarly be transmitted via another type of wireless communication network, such as a WiFi, WiMax or MiFi network. Further, the computing devices 10a-10c may be configured to select among a number of alternative wireless networks (e.g., cellular, WiFi and MiFi) based upon a variety of factors, including signal strength, reliability, cost, and access rights. Further, files transmitted by one computing device 10a via one wireless network may be received the recipient computing device 10b via a different wireless network. For example, a transmitting computing device 10a may transmit a selected file to a recipient device e-mail address via cellular telephone data communication link, but the recipient computing device may receive the e-mail from its e-mail server via a local WiFi wireless hotspot coupled to the Internet. The methods by which messages are routed through external networks and the Internet are well known and thus not described further herein.

The various aspects are also not limited to radio frequency wireless communications, as the communication among mobile devices may be accomplished via visible or infrared light or ultrasound. For example, the messages employed in the various aspects may be transmitted via infrared data links using well known technologies, such as the infrared transceivers included in some mobile device models. As another example, the messages employed in the various aspects may be transmitted via visible light, such as a small projector on one mobile device (e.g. a "pico projector") that may be aimed at a camera on a second mobile device to exchange images. As a further example, future mobile devices that may be equipped with ultrasound emitters and receivers may be configured to use ultrasound to communicate data across short distances in a manner similar to radio frequency communications.

Figure 2B:
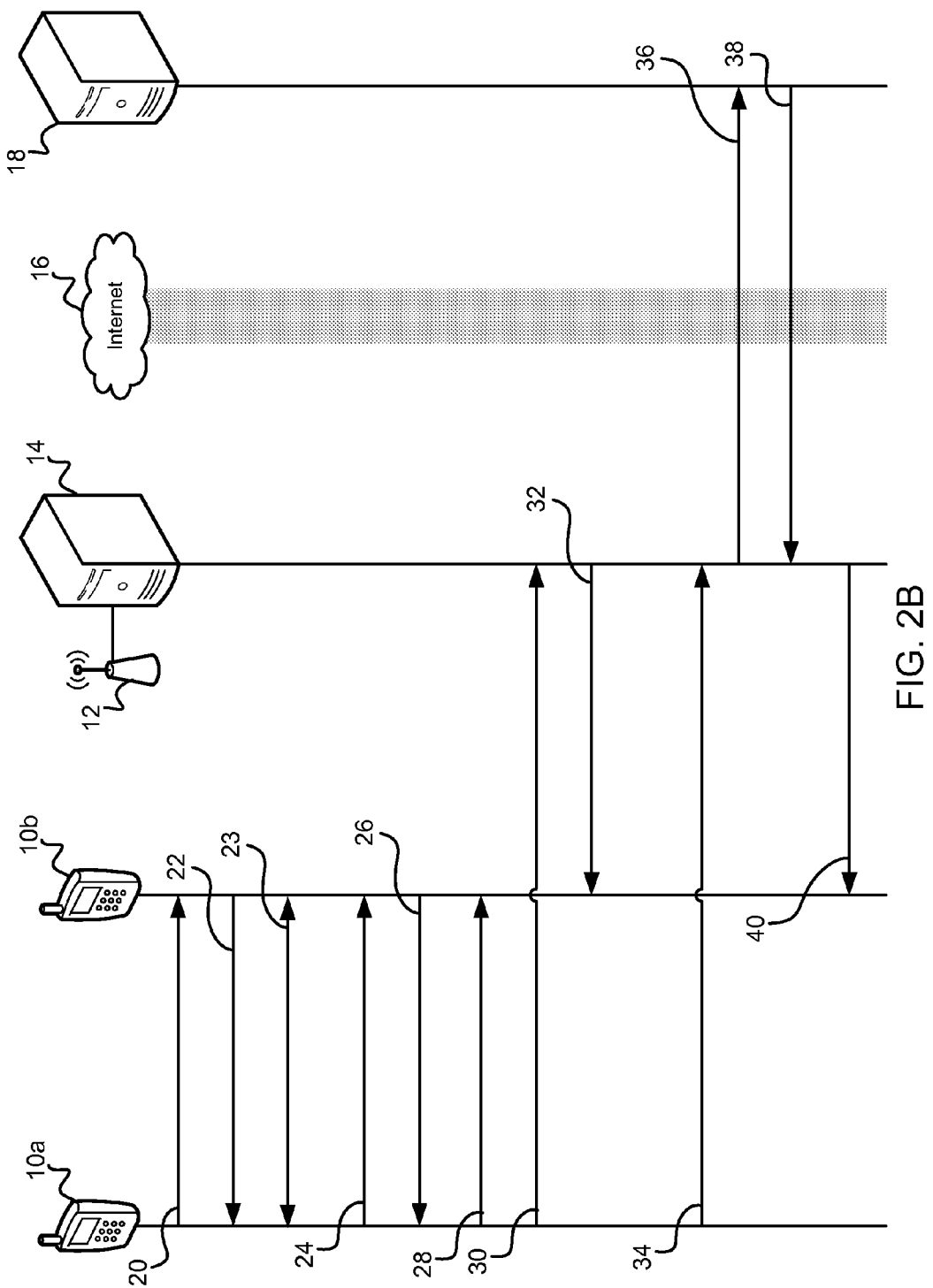
FIG. 2B is a message flow diagram illustrating communications between components of the network of FIG. 2A.

Representative communications that occur between different components of the communication network described above with reference to FIG. 2A are illustrated in FIG. 2B. A computing device 10a that has its file transfer functionality activated may discover nearby computing device 10a by sending a device discovery signal, message 20. The other computing device 10b, upon receiving the device discovery signal, may transmit a response message 22. The device discovery and response signals may include device identifying information about the computing devices 10a, 10b to enable the devices to negotiate a communication link, messages 23. The device discovery, response, and handshaking message formats will be defined by the particular communication protocol used for the device-to-device communications (e.g., Bluetooth®). As part of the response or handshaking messages 22 or 23, the replying computing device 10b may provide information about the device, such as its access data, its location (e.g., in the form of GPS coordinates) and, optionally, information about its owner such as a name or picture of the owner. Based on a detected motion gesture, the sending computing device 10a may determine that the user desires to share a particular file with a targeted computing device 10b. To accomplish a file transmission, the sending computing device 10a may send a query, message 24, to the targeted computing device 10b requesting permission to transmit the file and access data for use in sending the file. Based on the preferences of its owner and in response to the query message 24 received from the transmitting computing device 10a, the targeted computing device 10b may respond by transmitting the requested access data, message 26.

If the access data sent to the transmitting computing device 10a specifies that the file should be transmitted via the established device-to-device communication link (e.g., a Bluetooth® link), the transmitting computing device 10a may directly transmit the file to the targeted computing device 10b in message 28.

If the access data sent to the transmitting computing device 10a specifies a telephone number, the transmitting computing device 10a may compose an SMS or MMS message including the file and transmit the message via the cellular network 14 wireless access point 12, message 30. The cellular network 14 relays the SMS/MMS message to the targeted computing device 10b using the telephone number, message 32.

If the access data provided to the transmitting computing device 10a is an e-mail address, the transmitting computing device 10a may compose and send an e-mail message via the cellular network 14 wireless access point 12 (or other type of wireless network), message 34. The cellular network 14 may relay the e-mail message to an addressed e-mail server 18 via the Internet 16, message 36. The e-mail server 18 may store the e-mail message and, when accessed, relay the e-mail message to the cellular network 14, which provides service to the targeted computing device 10b via the Internet 16, message 38. The cellular network 14 relays the e-mail message to the targeted computing device 10b via a wireless access point 12, message 40. If the access data includes an IP address, the computing device 10a may access the server with that IP address via the cellular network 14 and the Internet 16 to upload the file in a manner very similar to how an e-mail message is sent to an e-mail server. The targeted computing device 10b may access the server at the same IP address via the cellular network 14 and the Internet 16, and download the file in a manner very similar to how an e-mail message is received from the e-mail server.

In an aspect illustrated in FIG. 3, a computing device 10 may inform a user that the file sharing functionality is active by displaying a radar map 802 of nearby computing devices.

Such a radar map display 802 may use graphical indicators 804, such as dots or circles, to show the location of other nearby computing devices which have wireless communication links established with the user's computing device 10. As described above, the wireless communication links to nearby computing devices and the device location information used to create the radar display 802 may be established and exchanged during the device discovery process commenced by activation of the file sharing functionality. The orientation of the nearby computing devices may be shown relative to the location of the user's computing device 10. The location of the user's computing device may be indicated on the radar map 802 by the launch pad 304. As the user moves, the orientation of the dots with respect to the launch pad 304 may change, indicating the changing relative location of the other computing devices with respect to the user's location. The radar map 802 display may be enabled or disabled based on the user's preferences.

Figure 4:
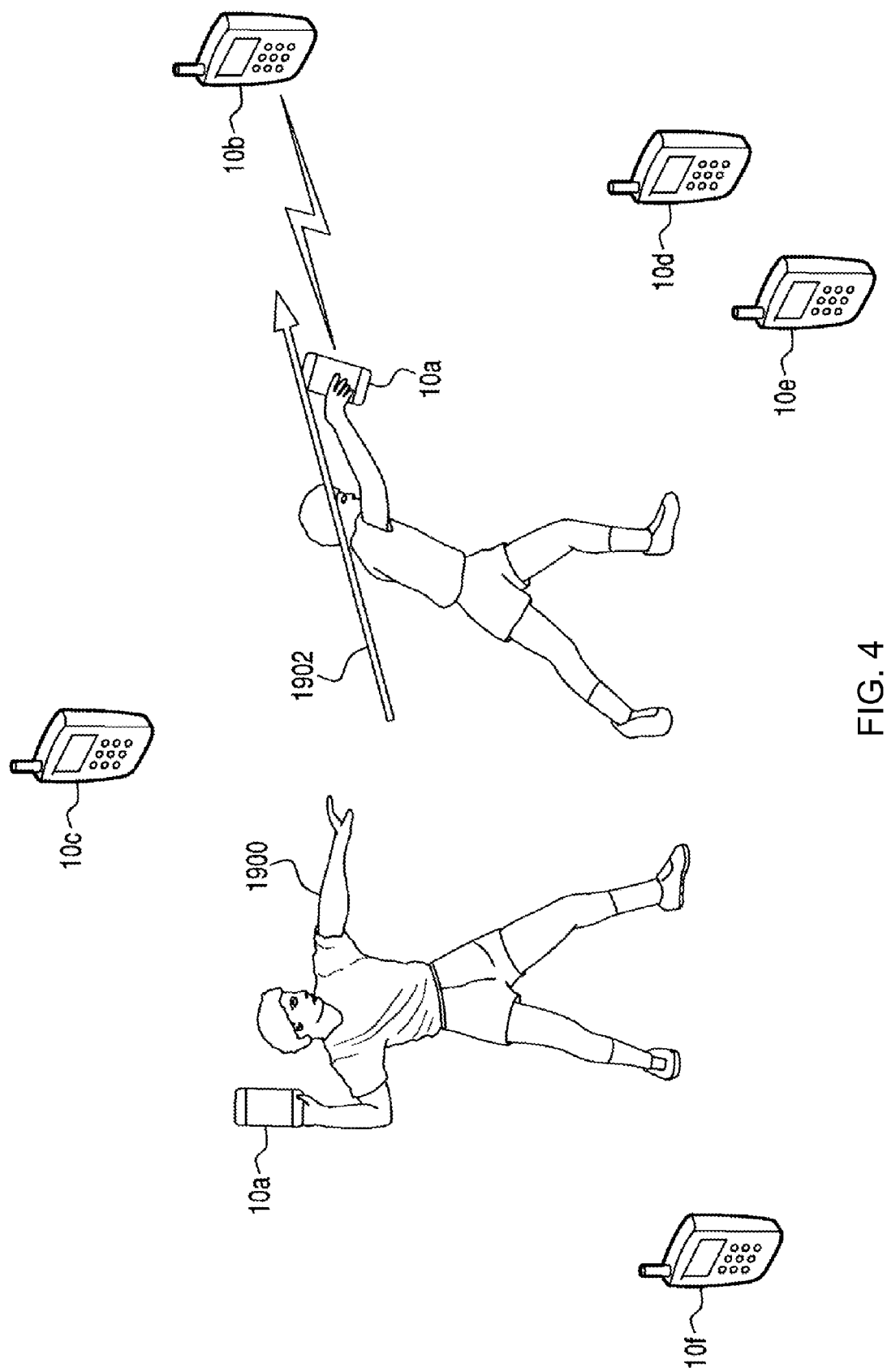
FIG. 4 is an illustration of a user executing a throw gesture to transmit a file according to an aspect.
Figure 5:
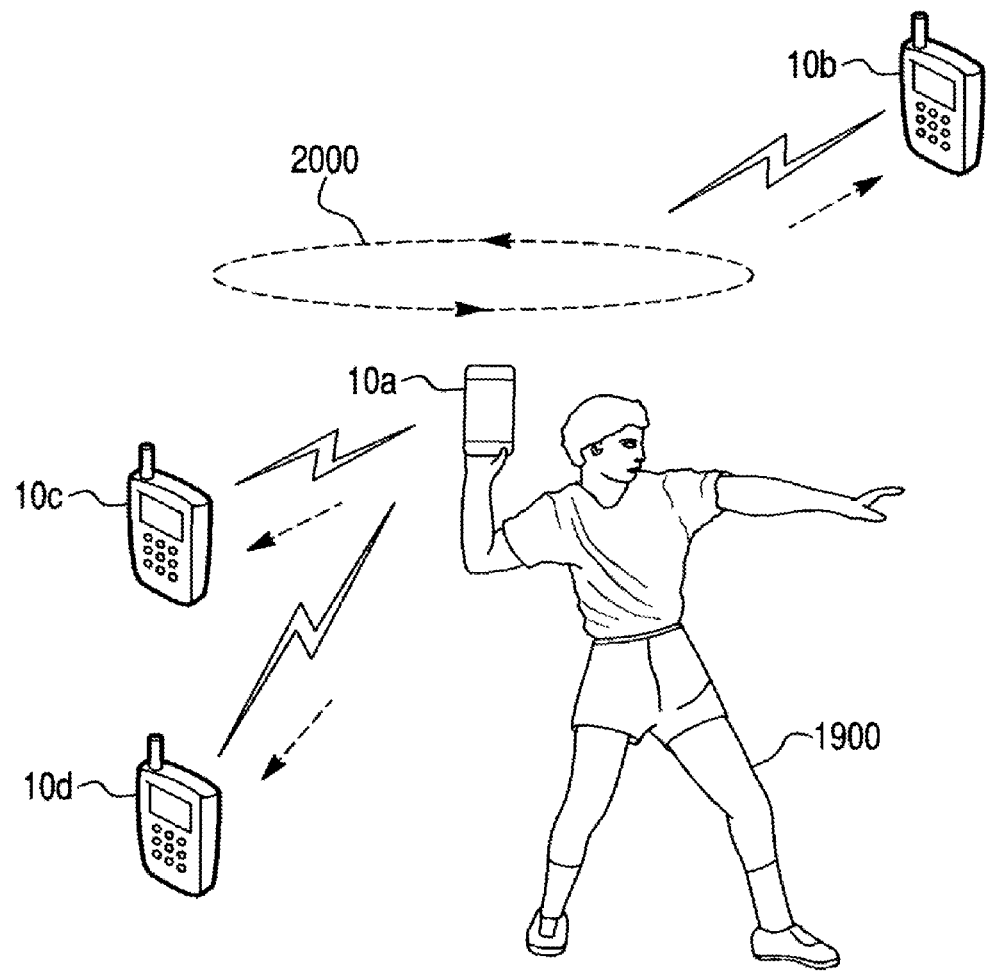
FIG. 5 is an illustration of a user executing a counterclockwise ellipsoid gesture to transmit files according to an aspect.
Figure 8:
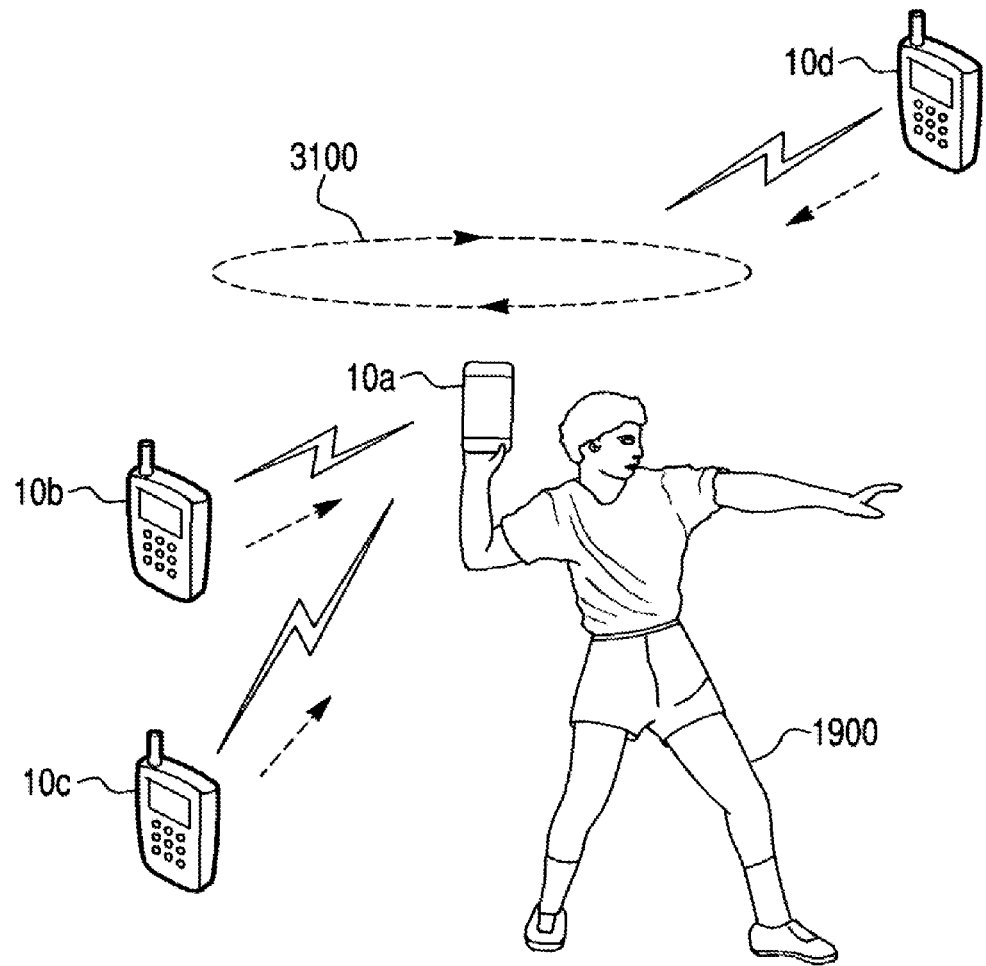
FIG. 8 is an illustration of a user executing a clockwise ellipsoid gesture to request file transfers according to an aspect.
Figure 9:
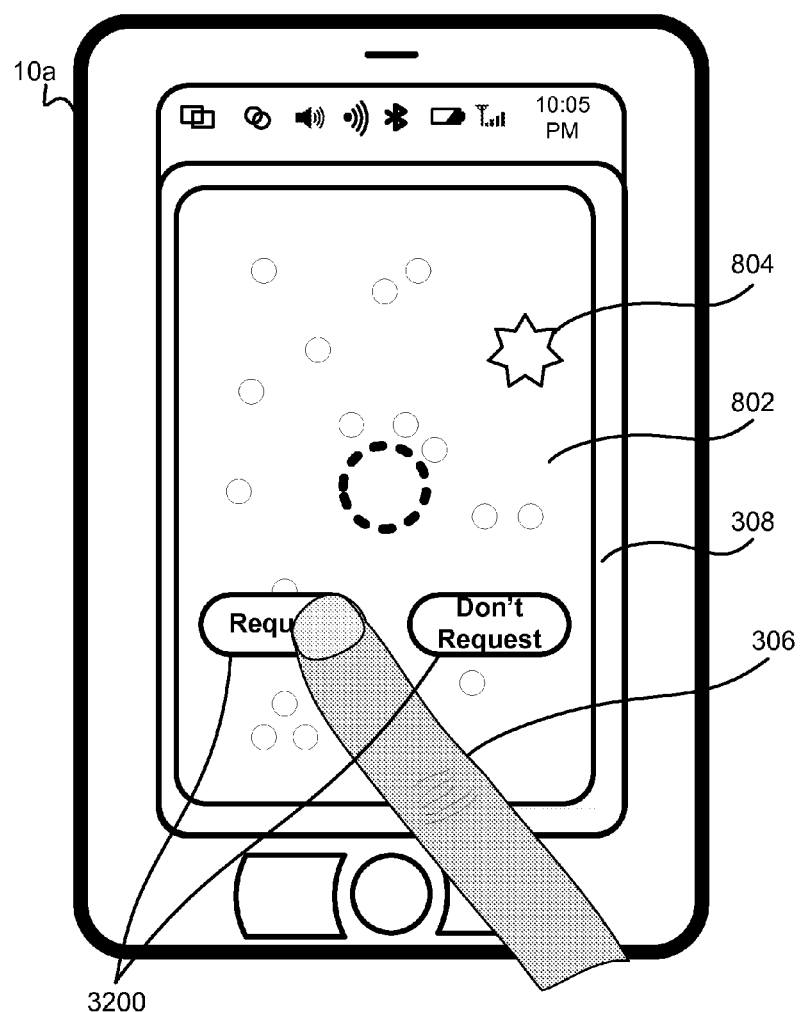
FIGS. 9-10 are frontal views of a portable computing device illustrating displays for verifying the identity of targeted devices according to an aspect.

Once the file sharing functionality is activated and a wireless link is established between nearby computing devices, different methods may be employed for sharing files among the linked computing devices. One method in which files may be shared is by transmitting files to another computing device 10. A second method in which files may be shared is by transmitting a request from the computing device 10 requesting another computing device to send it files. FIGS. 4 and 5 illustrate different aspect gestures that may be used to initiate the transmission of files to other computing devices. FIG. 8 illustrates a aspect gesture that may be used to cause a computing device 10 to request files from other computing devices.

In an aspect shown in FIG. 4, the transmitting computing device 10a may be configured to detect a throw motion gesture and interpret this motion to determine an intended recipient computing device to which it should transmit files. In this aspect, the computing device 10a may include a compass and accelerometer sensors, and may be configured to detect the direction and acceleration of the computing device 10a in a mock throwing gesture. The computing device 10a may further be configured to calculate the distance a file would travel if it were a physical object based on the calculated throwing speed (based on measured accelerations) and direction parameters of the throw gesture, and identify the targeting computing device 10b by identifying the computing device closest to where a real object would land following a ballistic trajectory. A user 1900 may touch a button or virtual button to activate the throw gesture function, and then mimic throwing the computing device as shown by the line and arrow 1902 towards a targeted computing device 10b. The computing device 10a may measure the direction of the throwing gesture and calculate a ballistic trajectory based on the measured accelerations. Once the distance and direction of the throw gesture are determined, the computing device 10a may identify the closest computing device as the targeted computing device 10b, and interpret this gesture to begin the process of transmitting files to the device.

In a further aspect, a computing device may be configured to provide a training or calibration functionality. In this training/calibration functionality, users may practice the various flick gestures to learn how to "flick" or "throw" a file to a particular location. For example, a user of one computing device may attempt to designate another computing device as the targeted computing device. With only a single nearby computing device and in the training/calibration mode the computing device 10 may be configured to provide feedback to the user, such as that the user "threw" the file too far or not far enough. Also, the computing device 10 may be configured to enable the user to calibrate the throwing motion gesture. For example, following a throw gesture directed towards another computing device in the training/calibration mode, the computing device 10 may prompt the user (e.g., with a display or a verbal communication) to indicate whether the force or speed of the throw motion should be associated with the measured distance to the other computing device. If the user agrees, the computing device 10 may adjust coefficients in the ballistic trajectory calculations using the measured force or speed so that whenever a throw gesture is sensed with the same force or speed the calculated impact point will be the same distance away as the other computing device in the calibration step.

In an aspect shown in FIG. 5, the transmitting computing device 10a may be configured to recognize a counterclockwise ellipsoidal hand gesture and interpret the gesture to mean that the device should begin transmitting a selected file to all the identified nearby computing devices 10b-10d. In this aspect, the transmitting computing device 10a may be configured to detect a user's touching of a button or virtual button that indicates the motion gesture is about to begin and prepare to transmit files based on a gesture. The user 1900 may then swing the computing device above the user's head in a counterclockwise generally circular manner 2000 to form a closed elliptical path, which is detected by the computing device based upon measurements by accelerometer sensors. The user may move the computing device in a counterclockwise ellipsoidal direction to indicate that the device should initiate the processes to transmit a selected file to all wirelessly linked computing devices 10b-10d.

Figure 6:
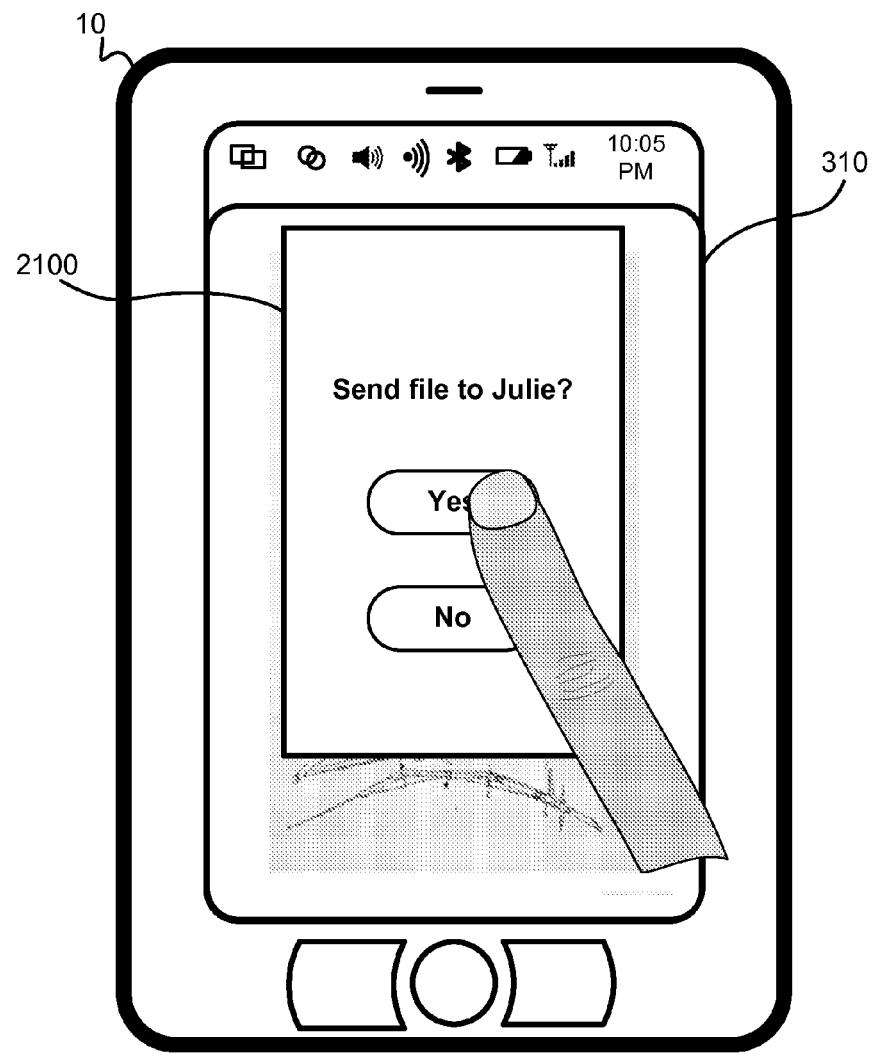
FIGS. 6-7 are frontal views of a portable computing device illustrating display for verifying transmission of files according to an aspect.
Figure 7:
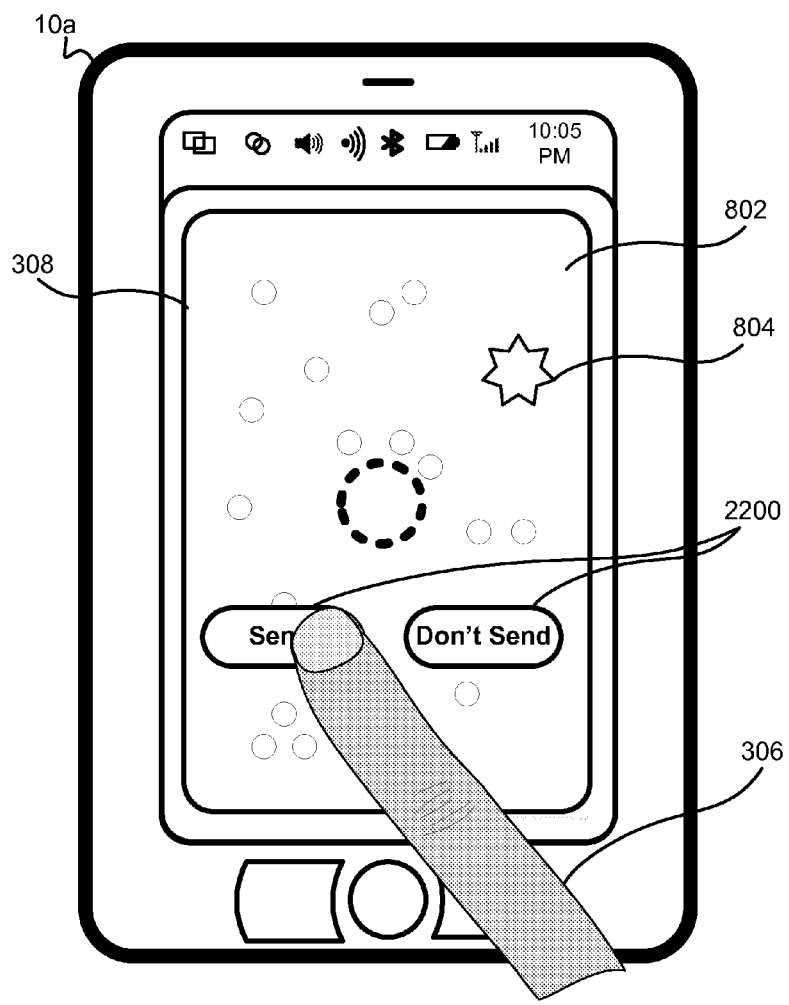

In an aspect shown in FIGS. 6-7, the transmitting computing device 10 may be configured to prompt the user to verify transmission of files to a particular computing device before the transmission is begun. Once the targeted computing device 10 is identified based on the user's gestures and location of the other computing devices 10 as described above, the transmitting computing device 10 may generate a display prompting the user to verify the identity of the targeted computing device 10. In an exemplary aspect illustrated in FIG. 6, the transmitting computing device 10 may be configured to present an identity of the owner of the targeted computing device. The identity of the owner may be a name or photo, and the information may be obtained from the transmitting computing device's contact database, or from the targeted computing device, such as during the handshaking process or as part of the transmitted access data. For example, if the identity of the targeted computing device owner is known, a question pane 2100 may be presented on the display 310 prompting the user to indicate whether the file should be transmitted to the identified person. The user may select "Yes" to verify the transmission file, and "No" to repeat the process of identifying a targeted computing device 10.

In another aspect shown in FIG. 7, the transmitting computing device 10 may be configured to display a radar map 802 in which the identified targeted computing device 10 is identified with a graphical indicator 804, such as a star, in conjunction with a prompt requesting the user to verify the file transmission. The verification prompt may display a question pane 2200 to prompt the user to verify the transmission of a selected file to the indicated computing device. The user may touch the touchscreen 308 with a finger 306 to indicate that the file should be transmitted or to prevent transmission so a different computing device can be selected.

In an aspect shown in FIG. 8, the requesting computing device 10a may be configured to recognize a clockwise ellipsoidal movement gesture 3100 to mean sending a request for receiving files to every linked computing device 10b-10d.

This movement gesture 3100 may be accomplished by the user raising the computing device and swinging it in a clockwise approximately circular motion to form a closed elliptical path. This movement gesture 3100 may be recognized by the computing device to indicate that the computing device should transmit file request messages to all nearby computing devices 10 without having to individually target each linked computing device 10b-10d. When the movement gesture is recognized, the computing device 10a may transmit file request messages to every linked computing device 10b-10d.

The requesting computing devices 10 may be configured to display a prompt to enable the user to verify the identity of the targeted computing devices 10 before a file transfer request message is transmitted. In an aspect shown in FIG. 9, a requesting computing device 10 may be configured to identify a targeted computing device 10a on a radar map 802 display using a graphical indicator 804, such as the star, and display a decision pane 3200 requesting the user to confirm or reject the device selection. In the illustrated example, two decision soft keys 3200 are displayed to allow the user to verify the action by pressing "Request" soft key, or stop the request, such as to select a different targeted computing device, by pressing the "Don't Request" soft key.

Figure 10:
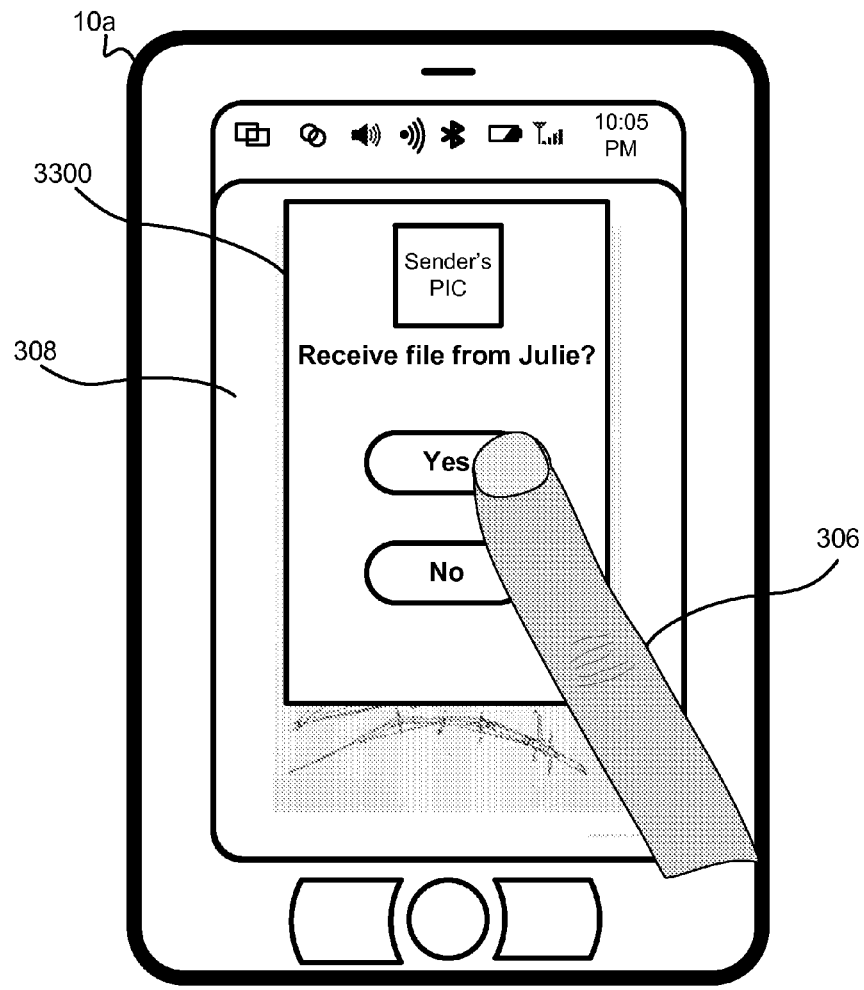

In an aspect shown in FIG. 10, when the identity of the owner of the targeted computing device 10 can be ascertained, such as by looking up the device in the user's contact database, the requesting computing device 10a may enable the user to verify the request transmission using that identification data. The identity of the owner of a targeted computing device 10 may be displayed as a name, picture, telephone number or email address of the owner. For example, if the picture and name of the owner of the targeted computing device is available, such as in the contact database or transmitted by the targeted computing device, the requesting computing device 10a may display a verification prompt pane 3300 including the profile picture and the name of the owner of the targeted computing device 10 along with a prompt for the user to verify the transmission of the requests to the targeted computing device 10. For example, the user may press a "Yes" or "No" soft key to verify the transmission of the request message.

Figure 11:
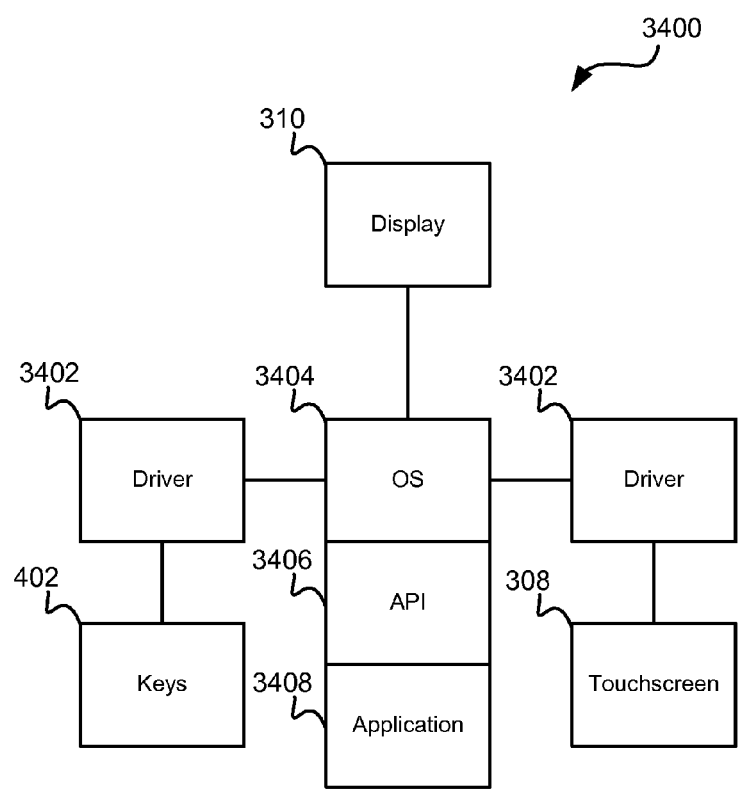
FIG. 11 is a system block diagram of a computing device suitable for use with the various aspects.

FIG. 11 illustrates hardware and software components 3400 of a computing device 10 suitable for use with the various aspects. A computing device 10 may be programmed with an application 3408 to provide the file sharing functionality of the various aspects. The application 3408 may communicate with the operating system (OS) 3404 through an application programming interface (API) 3406. An API 3406 is an interface that defines the ways by which an application program may request services from libraries and or OS 3404. Alternatively, the file sharing functionality may be implemented in a series of new APIs. The file sharing functionality application 3408 may communicate with users through the device display 310, touchscreen 308, and physical keys 402. For example, users may depress a key 402 or touch the touchscreen 308 to activate the file sharing functionality. Users may also use the touchscreen 308 to trace flick gestures to initiate file sharing communications. Information received through presses of the keys 402 and/or touchscreen 308 may be communicated to the operating system 3404 and via drivers 3402. Drivers 3402 act like translators between the keys 402 and touchscreen 308, and the OS 3402. The information received via the drivers 3402 may be communicated to the application 3408 via an API 3406. The application 3408 may provide information to the user on the display 310. The information that may be displayed to the user may include instructions for activating the file sharing functionality, graphical indicators to facilitate the use of the file sharing functionality, the location and identity of other computing devices 10, and verification questions.

The file sharing functionality and hand and flick gestures described above may be implemented using the methods described below with reference to FIGS. 12-23.

Figure 12:
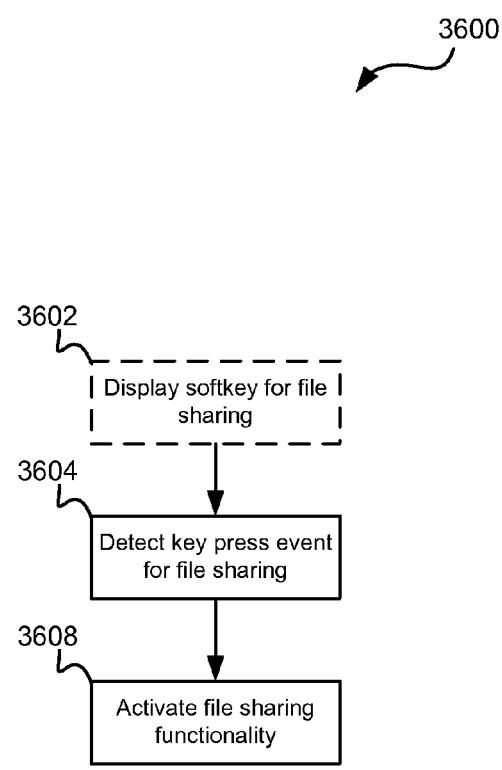
FIG. 12 is a process flow diagram of an aspect method for activating the file sharing functionality using function keys and soft keys.

FIG. 12 illustrates a process flow of an aspect method 3600 for activating the file sharing functionality in response to the press of a function key 402 or soft key 502. In method 3600 at block 3604, the computing device 10 may be configured to detect a key 402 press event for activating the file sharing functionality. Optionally, if a soft key is used to activate the file sharing functionality, the computing device 10 may be configured to display the soft key 502 at block 3602. A soft key 502 press event may also be detected for activating file sharing functionality at block 3602. At block 3608 the computing device may activate the file sharing functionality.

Figure 13:
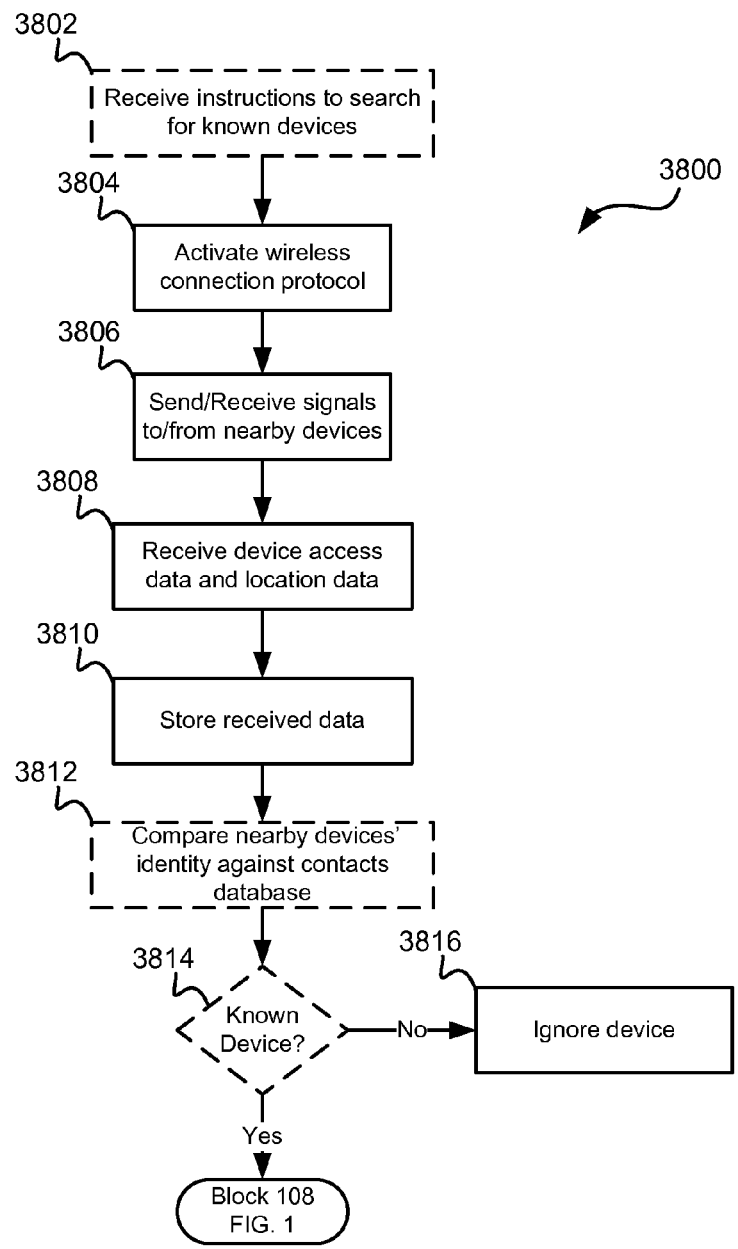
FIG. 13 is a process flow diagram of an aspect method for discovering nearby devices.

FIG. 13 illustrates a process flow of an aspect method 3800 for discovering nearby computing devices and establishing wireless communication links with discovered devices. Activation of the file sharing functionality may cause the computing device processor to activate a wireless transceiver (if not already activated) at block 3804, and to begin sending device discovery signals to and receiving response signals from nearby computing devices at block 3806, as defined by the wireless communication protocol of the activated transceiver (e.g., Bluetooth®). As discussed above, this exchange of device discovery and response signals allows nearby computing devices 10 to discover one another's presence and establish wireless communication links. As part of establishing the communication links, the computing devices may exchange access data and location data at block 3808. This exchange of device data may include identification data and photographs. For example, the computing device 10 may receive identifying data such as profile pictures of the owners of nearby computing devices at block 3808. Access data may include information that may be used by the computing device to communicate with the targeted computing device 10, such as Bluetooth® identification data, telephone numbers, and e-mail addresses. Alternatively, transmission of access data may depend on the user authorizing a file transfer operation, and thus may not occur before a computing device is authorized to receive files from a transmitting computing device. The process of requesting and granting access authorization between transmitting targeted computing devices is described in more detail below with reference to FIGS. 20-21. The computing device may store the received data at block 3810, and use the received data to determine the presence of the nearby computing device 10.

Optionally at block 3802, the computing device 10 may receive user instructions to search only for known nearby computing devices. For example, a computing device 10 may be instructed to search only for devices whose device data match those in the device's contact database. In this aspect, once nearby devices are discovered, the computing device 10 may compare the nearby devices' identity against the contact database at block 3812, to determine whether the nearby computing device is known at determination block 3814. If the detected nearby computing device is not known (i.e., determination block 3814="No"), the computing device 10 may ignore that device at block 3816. If the detected nearby computing device is known (i.e., determination block 3814="Yes"), the computing device 10 may determine the location of the nearby device at block 108 in FIG. 1.

The location of computing devices 10 may be determined using various methods. For example, Global Positioning System (GPS) coordinate data receivers received from nearby computing devices may be used to determine their location relative to the device's own location. Alternatively or in addition, signal triangulation methods may be used in determining the relative location of the nearby computing devices 10.

Figure 14:
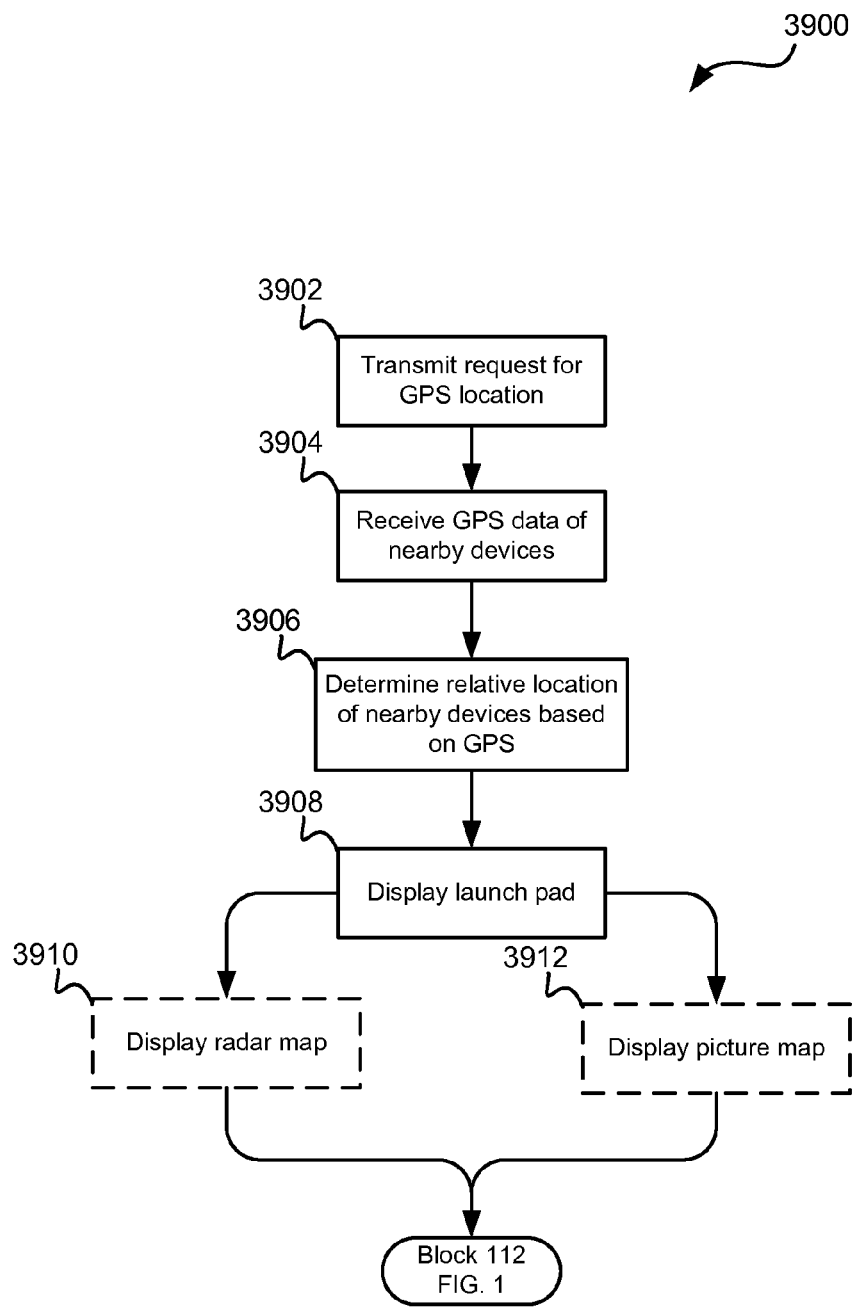
FIG. 14 is a process flow diagram of an aspect method for requesting location data from and displaying the relative location of the nearby devices with respect to the computing device.

FIG. 14 illustrates a process flow of an aspect method 3900 for determining location using GPS coordinates. In method 3900 at block 3902 the computing device 10 may send a request for location data from the nearby computing devices 10, and receive GPS coordinates from nearby computing devices 10 equipped with GPS navigation receivers at block 3904. The requesting computing device 10 may determine the relative location of nearby devices based on the received GPS data and position information obtained from the device's own GPS receiver at block 3906. At block 3908, the computing device may display a launch pad 304 image to indicate to the user that device is ready for receiving user commands for file sharing. The computing device 10 may then detect a file sharing gesture at block 112 in FIG. 1.

Optionally, the computing device 10 may employee different GUI displays to show the relative locations of nearby computing devices 10. For example, the computing device 10 may display a radar map 802 including graphical indicators that show the location of all the nearby computing devices 10 with respect to the location of the computing device 10 at block 3910. Alternatively, the computing device 10 may display a picture map including pictures of the owners of the nearby computing devices 10 at block 3912. The computing device 10 may then detect a file sharing gesture at block 112 in FIG. 1.

Figure 15:
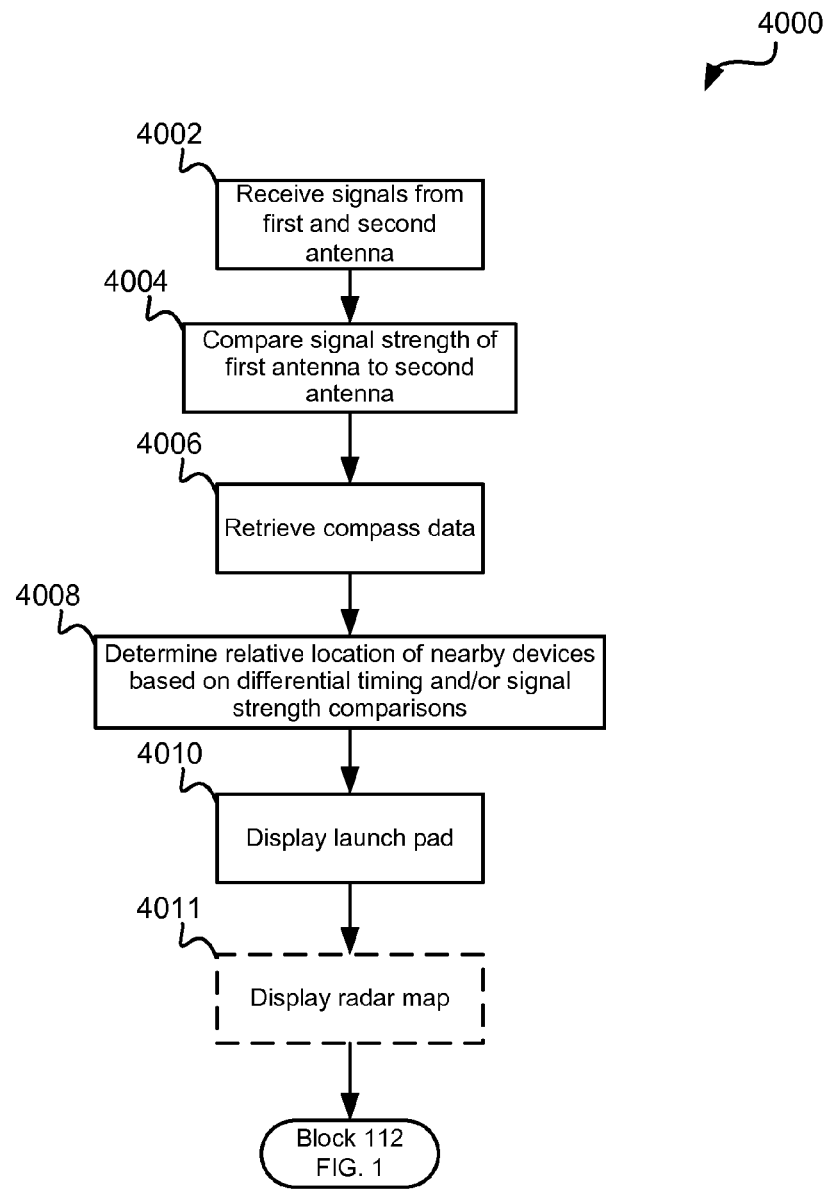
FIG. 15 is a process flow diagram of an aspect method for determining locations of nearby devices using signal triangulation.

FIG. 15 illustrates a process flow diagram of an aspect method 4000 for determining the relative location of nearby computing devices 10 using triangulation. Computing devices 10 may include two antennas and a compass to enable determination of the location of nearby devices using triangulation. The computing devices 10 may receive signals on a first and a second antenna at block 4002, and compare the timing or signal strength of signals received by the two antennas at block 4004. The computing device 10 may also receive data from the compass sensor at block 4006, and determine the relative location of nearby devices based on differential timing and/or signal strengths, and the compass data at block 4008. The triangulation analyses that can be used to determine relative locations are well known. Once the location of the nearby computing devices 10 is determined, at block 4010 the computing device 10 may display a launch pad 304 to allow the user to trace file sharing gestures. The computing device 10 may then detect a file sharing gesture at block 112 in FIG. 1. Optionally, at block 4011 the computing device 10 may display a radar map 802 display, including graphical indicators to show the relative location of the nearby computing devices with respect to the computing device 10.

Once file gesture functionality is activated and nearby computing devices are discovered, different gestures may be used command the computing device 10 to share files with nearby computing devices 10. These gestures may include those that require the user to move the computing device 10, and those that require the user to trace a shape on the touchscreen 308 of the computing device 10 using a finger 306.

Figure 16:
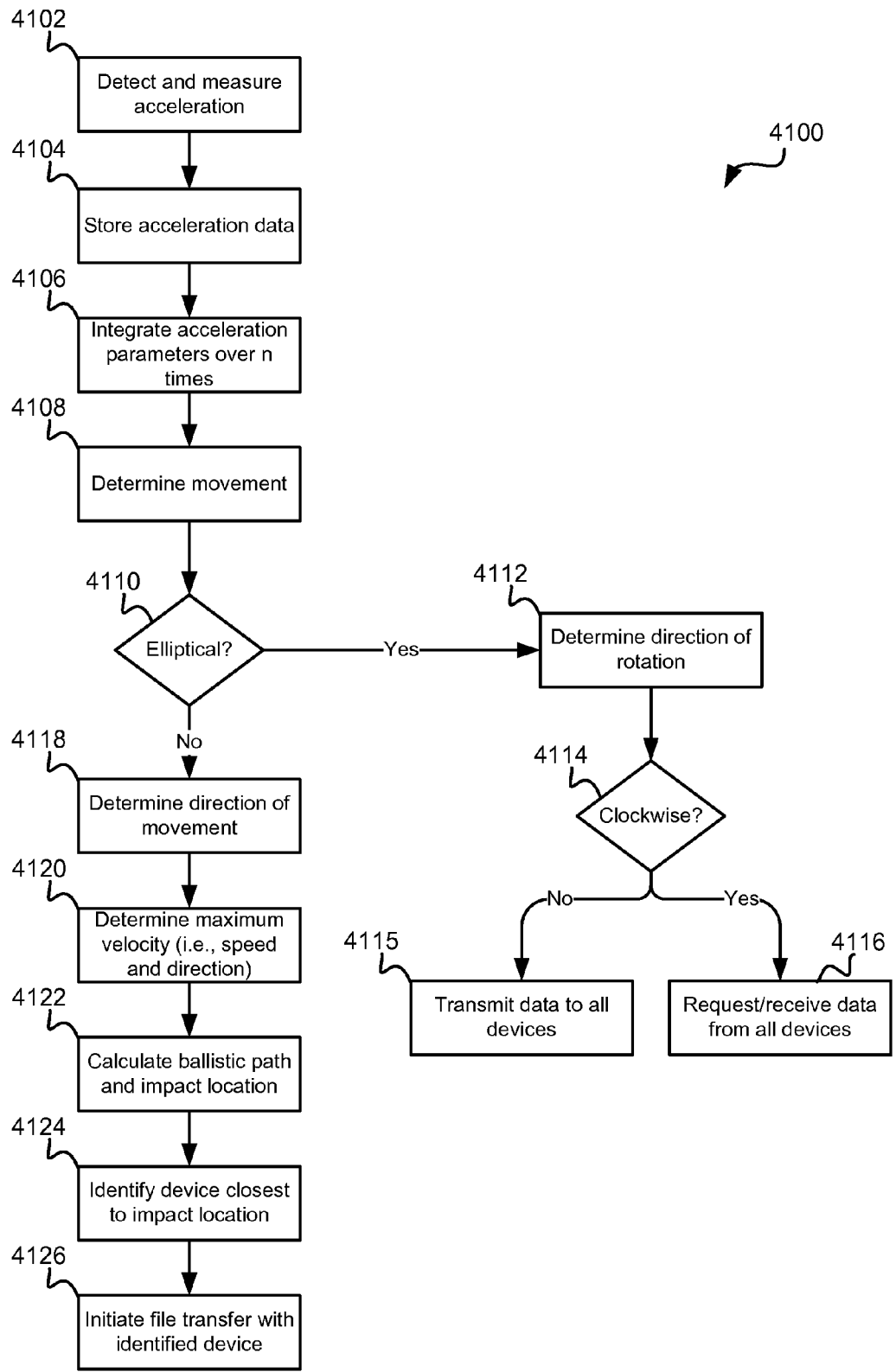
FIG. 16 is a process flow diagram of an aspect method for initiating transmitting files using device movement.

FIG. 16 illustrates a process flow diagram of an aspect method 4100 for detecting and identifying the type of movement gesture made using the computing device 10. The computing device 10 may be configured with accelerometers to detect and measure accelerations along three axes of the computing device 10 at block 4102, and store the acceleration data at block 4104. The computing device may be configured to integrate the acceleration measurements over "n" times at block 4106, and to calculate that the speed and relative direction indicate that the device is moving at block 4108. The computing device may also determine whether the movement is tracing an elliptical path in space at determination block 4110. If the computing device movement is following an elliptical path (i.e., determination block 4110="Yes"), the computing device 10 may calculate the direction (clockwise/counterclockwise) of the movement at block 4112, and determine whether the direction is clockwise at determination block 4114. If the direction of the movement is clockwise (i.e., determination block 4114="Yes"), the computing device may transmit a request data to all nearby linked computing devices 10 at block 4116. If the direction of movement is counterclockwise (i.e., determination block 4114="No"), the computing device may initiate the processes to transmit a selected file to all nearby linked computing devices 10 at block 4115.

If the computing device's movement is not following an elliptical path (i.e., determination block 4110="No"), the computing device 10 may determine the direction of the movement at block 4118, determine the maximum velocity of the computing device at block 4120, and calculate a ballistic trajectory and impact location at block 4122 based on the determined direction and maximum velocity. At block 4124 the computing device 10 may then identify the computing device 10 positioned closest to the calculated impact location, and initiate the file transfer process with the identified computing device 10 at block 4126.

Figure 17:
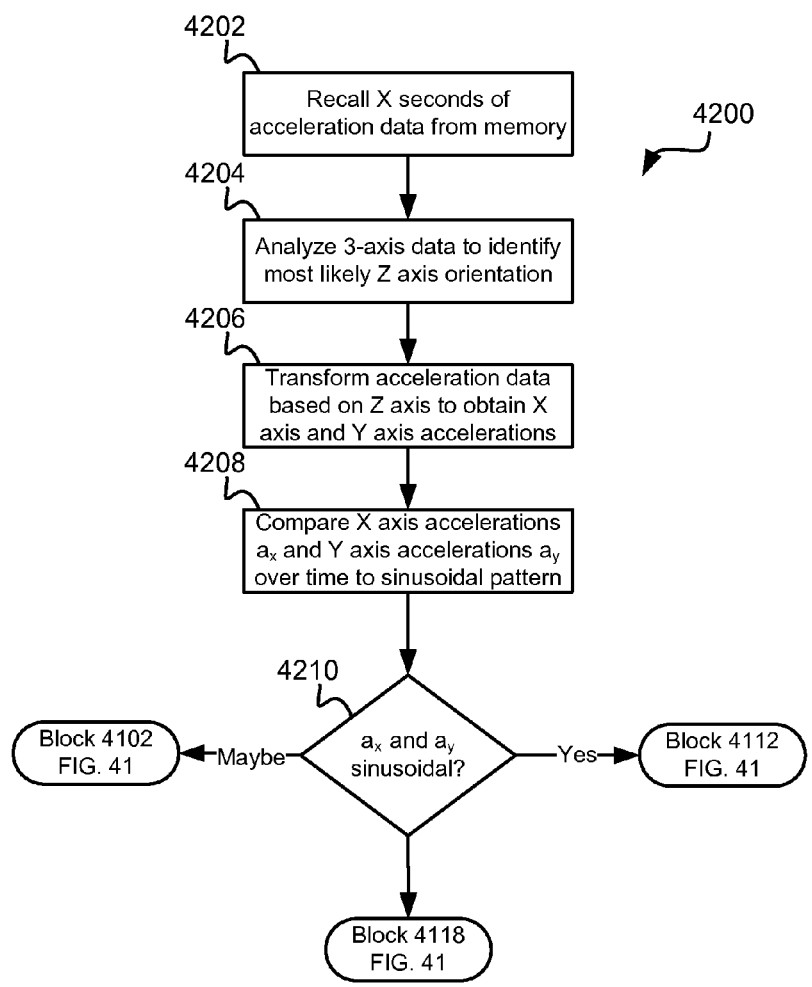
FIG. 17 is a process flow diagram of an aspect method for determining whether a computing device is being moved in an ellipsoidal motion.

FIG. 17 illustrates an aspect method 4200 for determining whether a computing device's movement is following an ellipsoidal path at determination 4110. Movement of a computing device in circular or elliptical path through space may be detected by analyzing accelerations over time, as may be measured by three accelerometers oriented along three perpendicular axes. As is well known, circular motion involves a near constant acceleration towards the center of the motion in a plane. Written in terms of axes X and Y in the plane of the elliptical motion, the integral of the accelerations over one or more orbits is equal to zero, while the accelerations along the X and the Y axes will follow an approximately sinusoidal pattern, each approximately 90 degrees out of phase. These mathematical characteristics may be used to recognize when the computing device is being moved along an elliptical path. In method 4200 at block 4202, the computing device processor may recall a block of accelerometer data from memory spanning a predetermined sampling time. This sampling time may be long enough to be able to recognize an elliptical movement within approximately one rotation. At block 4204 the processor may analyze the accelerometer data to identify the Z axis, which is the axis aligned with the gravity vector (i.e., the down direction). This calculation is necessary because a user is unlikely to hold the computing device in an orientation that aligns one of the accelerometers with the gravity vector. This calculation may be accomplished by averaging the accelerometer data over the entire span of data and using a simple trigonometric analysis to identify the average direction of the acceleration due to gravity relative to the accelerometer axes. With the gravity vector identified, at block 4206 the processor may apply a trigonometric transform to obtain accelerations along X and Y axes which are perpendicular to the determined Z axis. At block 4208 the processor may then compare accelerations vs. time along the X axis and accelerations vs. time along the Y axis to the expected sinusoidal (or similar periodic) function shapes in order to determine whether the accelerations are varying in a manner consistent with the computing device being moved through an elliptical path. This comparison may be accomplished using a number of mathematical tests, such as applying a prediction/comparison model, a comparing measured values to a sinusoidal pattern, and/or applying the data to an algorithm that can accomplish the comparison in a simple calculation. At determination block 4210 the processor may determine whether the X axis and Y axis accelerometer data is sinusoidal or otherwise consistent with an elliptical path. If the processor determines that the computing device is tracing an elliptical path (i.e., determination block 4210="Yes"), the processor may further analyze the data to determine the direction or rotation at block 4112 in FIG. 16. If the processor determines that the computing device is not tracing an elliptical path (i.e., determination block 4210="No"), the processor may proceed to analyze the motion as a potential throw gesture by proceeding to block 4102 in FIG. 16. It may also be that insufficient accelerometer data has been obtained to determine whether the path is elliptical or not, in which case the processor may continue to gather an analyze accelerometer data by returning to block 4118 in FIG. 16.

Figure 18:
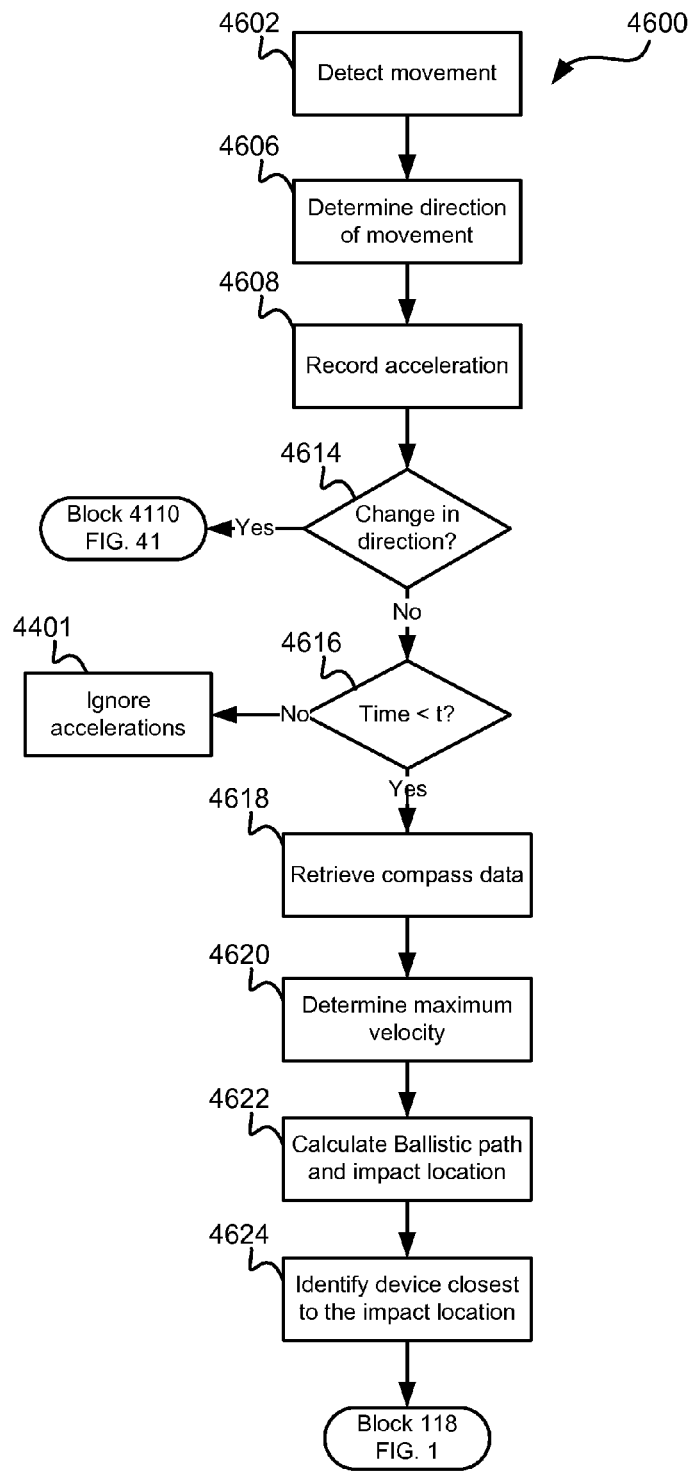
FIG. 18 is a process flow diagram of an aspect method for initiating transmitting files based on a throw gesture.

FIG. 18 illustrates a process flow diagram of an aspect method 4600 for identifying a targeted computing device 10 using the throw movement gesture. In method 4600 at block 4602 the computing device 10 may be configured to detect movement based upon acceleration data received from accelerometers, determine the direction of the movement at block 4606, and record the accelerometer data characterizing the movement at block 4608. At determination block 4614, the computing device 10 may determine whether there is a change in the direction of the movement by determining the Z axis and analyzing the accelerations in the X and Y axes in a manner similar to that described above with reference to FIG. 17. If there is change in the direction of the movement along the X and/or Y axes (i.e., determination block 4614="Yes"), the computing device 10 may determine whether the movement is elliptical by performing analyses as described above with reference to block 4110 in FIG. 16 and method 4200 in FIG. 17. If there is no change in the direction of the movement along the X and/or Y axes (i.e. at determination block 4614="No"), at determination block 4616 the computing device may determine whether the time interval in which the movement has occurred is less than a predetermined time "t" consistent with the throw gesture. If the movement was not performed within a predetermined time period "t" (i.e., determination block 4616="No"), the computing device 10 may ignore the acceleration data as indicative of other activities (e.g., being carried or traveling in an automobile) at block 4401. If the movement was performed within a predetermined time period "t" (i.e., determination block 4616="Yes"), the computing device 10 may receive compass data to determine an approximate direction of the throw gesture movement at block 4618, determine a maximum velocity of the throw gesture at block 4620, and calculate a ballistic trajectory and impact location based on the compass data and the maximum velocity at block 4622. The computing device 10 may then identify the computing device closest to the impact location at block 4624, and begin the processes to transmit files to that identified computing device at block 118 (FIG. 1).

Figure 19:
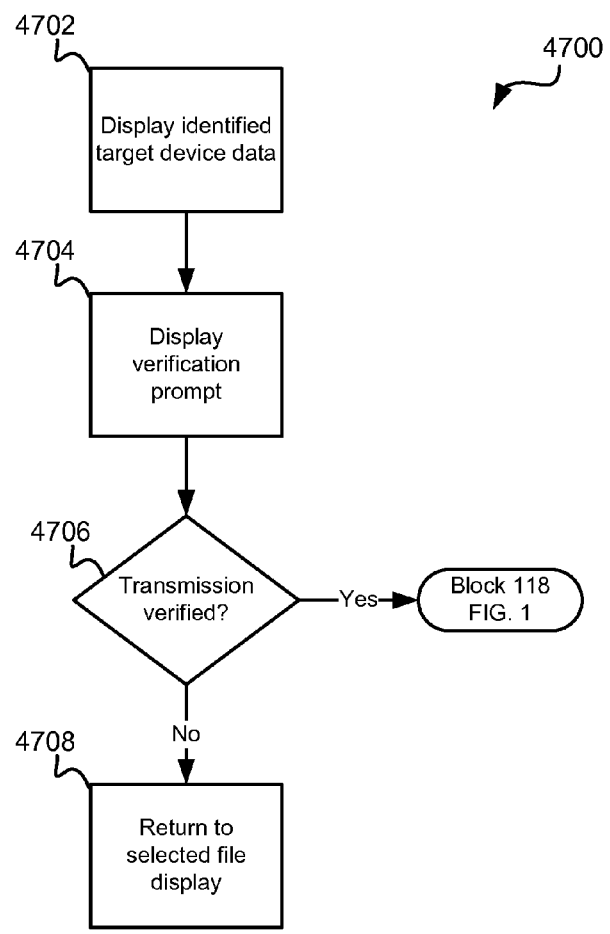
FIG. 19 is a process flow diagram of an aspect method for verifying identities of nearby devices.

Optionally, the transmitting computing device 10 may be configured to prompt the user to verify the identity of the targeted computing device 10 before beginning the processes for transmitting the file. FIG. 19 illustrates a process flow of an aspect method 4700 for prompting a device user to verify the identity of the targeted computing device 10 before transmitting a file. The computing device 10 may be configured to display identifying information about the targeted computing device at block 4702, and display a verification prompt at block 4704. Identifying information may include the location of the targeted computing device in a radar map 802, a picture profile of the owner of the targeted computing device and the cellular telephone number of the targeted computing device. For example, once a targeted computing device is identified, the computing device may provide the location of that identified device on the radar map 802. Because the location of nearby computing devices is displayed relative to the transmitting computing device 10, a user may verify the identity of the targeted computing device by comparing its position on the displayed radar map 802 to the position of the other nearby device users. The computing device 10 may determine whether file transmission is verified by the user based upon an appropriate user input at determination block 4706. If file transmission is verified by the user (i.e., determination block 4706="Yes"), the computing device 10 may begin the process of transmitting the file to the targeted computing device at block 118 in FIG. 1. If file transmission is not verified by the user (i.e., determination block 4706="No"), computing device 10 may returned to the selected file display at block 4708.

Figure 20:
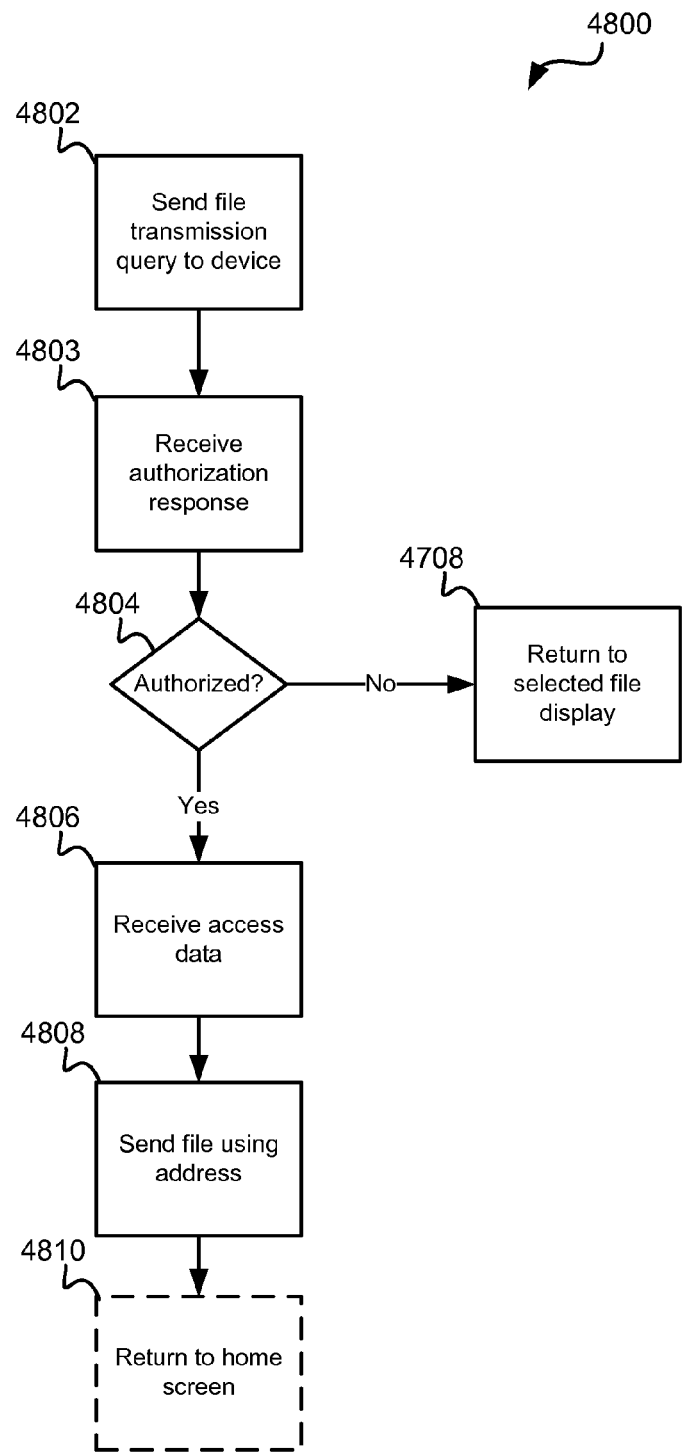
FIG. 20 is a process flow diagram of an aspect method for obtaining user authorization of file transmissions.

FIG. 20 illustrates a process flow of an optional aspect method 4800 for requesting authorization access data on a targeted computing device 10. In method 4800 at block 4802, the transmitting computing device 10 may send a file transmission query to the targeted computing device before transmitting a file. The computing device may receive an authorization response from the targeted computing device at block 4803, and determine whether authorization is granted at determination block 4804. If authorization is not granted in the response (i.e., determination block 4804="No"), a computing device 10 may returned to the selected file display at block 4708. If authorization is granted in the response (i.e., determination block 4804="Yes"), the computing device 10 may receive access data as part of the response, such as an address or authorization number at block 4806. At block 4808, the computing device may use the received access data to transmit the selected files to the targeted computing device. As discussed above, the method used to transmit the selected files may depend on access data received from the targeted computing device. For example, if the access data includes a telephone number, the transmitting computing device 10 may transmit the selected file as SMS or MMS messages. Optionally, once a selected file is transmitted, the transmitting computing device may return to the home screen at block 4810.

Figure 21:
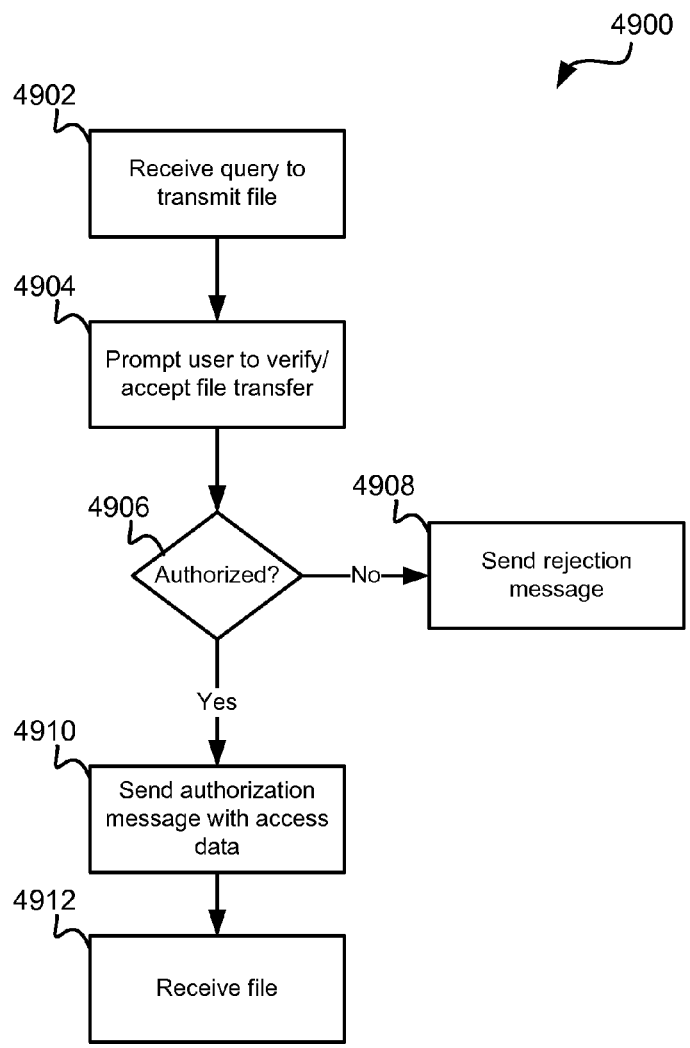
FIG. 21 is a process flow diagram of an aspect method for obtaining user authorization to receive file transmissions.

FIG. 21 illustrates a process flow of an optional aspect method 4900 for authorizing and sending access data to a transmitting computing device 10. In method 4900 at block 4902, the targeted computing device may receive a message from the transmitting computing device 10 requesting permission to transmit files to it. At block 4904, the targeted computing device 10 may generate a display prompting the user to authorize or deny this request. The targeted computing device 10 may receive the user input via a GUI selection and determine whether the user authorized receiving file transmissions at determination block 4906. If authorization is denied by the user (i.e., determination block 4906="No"), the targeted computing device 10 may send a rejection message to the transmitting computing device 10 at block 4908. If authorization is granted (i.e., determination block 4906="Yes"), the targeted computing device 10 may send an authorization response along with appropriate access data at block 4910. The targeted computing device 10 may receive the file from the transmitting computing device at block 4912. In an aspect, the authorization prompt presented to the user may further offer the user choices for how files should be transmitted. For example, a menu prompt may enable the user to choose among receiving the files as an SMS or MMS message, as an attachment to an e-mail message or as a direct file transfer via the established wireless communication link. The targeted computing device may receive the user's selection and include the appropriate address within the access data transmitted along with the response message. The transmitting computing device then uses the access data to transmit the files using the transmission method selected by the targeted user.

Figure 22:
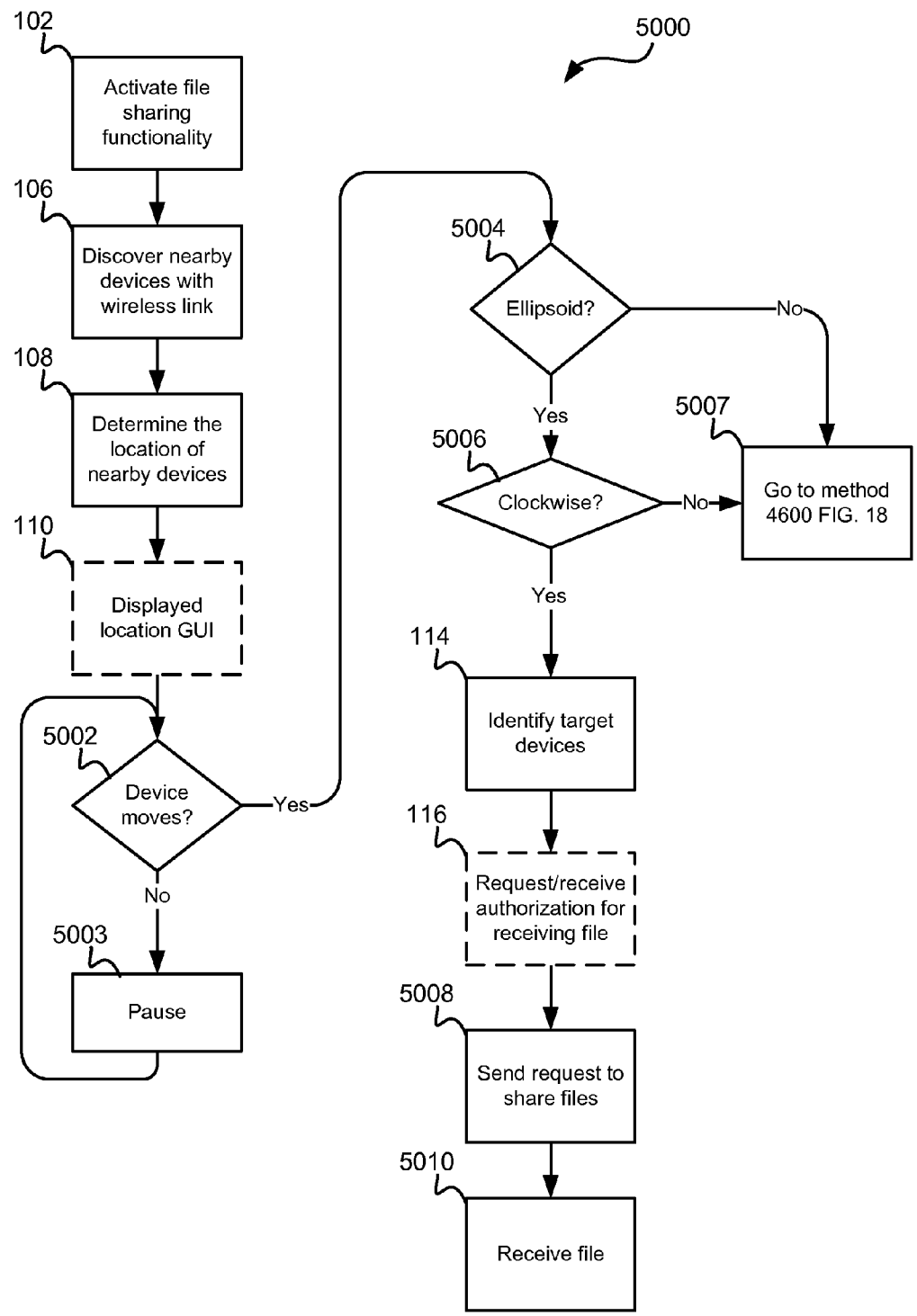
FIG. 22 is a process flow diagram of an aspect method for implementing a file request functionality.

FIG. 22 illustrates a process flow of an aspect method 5000 for requesting files from targeted computing devices 10. In method 5000 at block 102, a computing device 10 may activate the file sharing functionality. Activation of the file sharing functionality may prompt the computing device 10 to discover nearby devices at block 106, and to determine the location of the nearby computing devices based upon received responses at block 108. Optionally, at block 110, once locations of the nearby devices are determined, the computing device 10 may display a radar map 802 indicating the relative locations of discovered nearby computing devices. At determination block 5002 the computing device 10 may determine whether the computing device is being moved in a manner that could be a motion gesture. If the device is not moving, as may be indicated by accelerometer readings, (i.e., determination block 5002="No"), the computing device 10 may pause at block 5003 before sampling the accelerometers again.

If the computing device determines that it is moving (i.e., determination block 5002="Yes"), the computing device may determine whether the movement is following an elliptical path at determination block 5004. Methods for determining whether a path of motion is elliptical are described above with reference to FIG. 17. If the movement is determined to be not elliptical (i.e., determination block 5004="No"), the requesting computing device may perform the operations of method 4600 described above with reference to FIG. 18 at block 5007. If the movement is determined to be elliptical (i.e., determination block 5004="Yes"), the requesting computing device may determine whether the movement is clockwise at determination block 5006. If the movement is not clockwise (i.e., determination block 5006="No"), the requesting computing device 10 may ignore the accelerometer data at block 4401. If the movement is determined to be clockwise (i.e., determination block 5006="Yes"), the requesting computing device 10 may identify the nearby devices as the targeted computing devices at block 114. The requesting computing device 10 may then send a message to the targeted computing device requesting files, at block 5008, and receive files from the targeted computing device 10 at block 5010. Optionally, the computing device may be configured to request and receive authorization for sharing files from the targeted device at block 116, before transmitting the request to share files.

Figure 23:
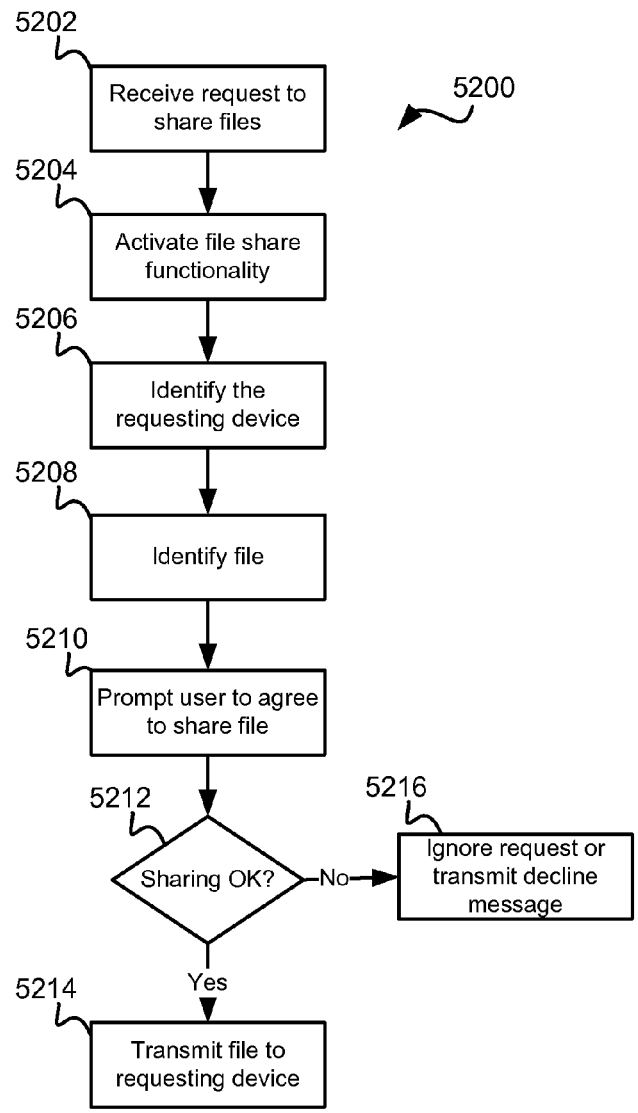
FIG. 23 is a process flow diagram of an aspect method for transmitting files in response to a file sharing request.

FIG. 23 illustrates a process flow of an aspect method 5200 for receiving a request to share files and transmitting a file to the requesting computing device 10. In method 5200 at block 5202, the request receiving computing device may receive a request to share files, and in response may activate the file sharing functionality at block 5204, and identify the requesting device at block 5206. At block 5208 the request-receiving computing device 10 may identify a file that may be transmitted to the requesting computing device 10. The file may be identified based on the designations received from the requesting computing device such as a picture, phone number, specific document, another person's contact number, or a response to a question. At block 5210 the request receiving computing device may display a prompt requesting the user to authorize transmitting the identified file to the identified requesting computing device. This prompt may identify the requesting computing device using any of the methods described in the various aspects, including, for example, a radar map, a user name, a user photograph, etc. At determination block 5212, the request receiving computing device may determine whether the user has agree to file sharing or declined to share the identified file with the identified computing device. If the user has agreed to share the file (i.e., determination block 5212="Yes"), the request-receiving computing device may begin the process of transmitting the identified file to the requesting computing device 10 at block 5214. If the user has not agreed to share the file (i.e., determination block 5212="Yes"), the request receiving computing device may ignore the request or transmit a message declining the request at block 5216.

In a further aspect a computing device to which a file is transmitted may be configured to redirect the file to another computing device if it is busy, such as involved in a telephone call or transmitting data. In a further aspect, a network delivering a file to the targeted computing device may be configured to redirect the file to another computing device if the targeted computing device is busy, such as involved in a telephone call or transmitting data.

Figure 24:
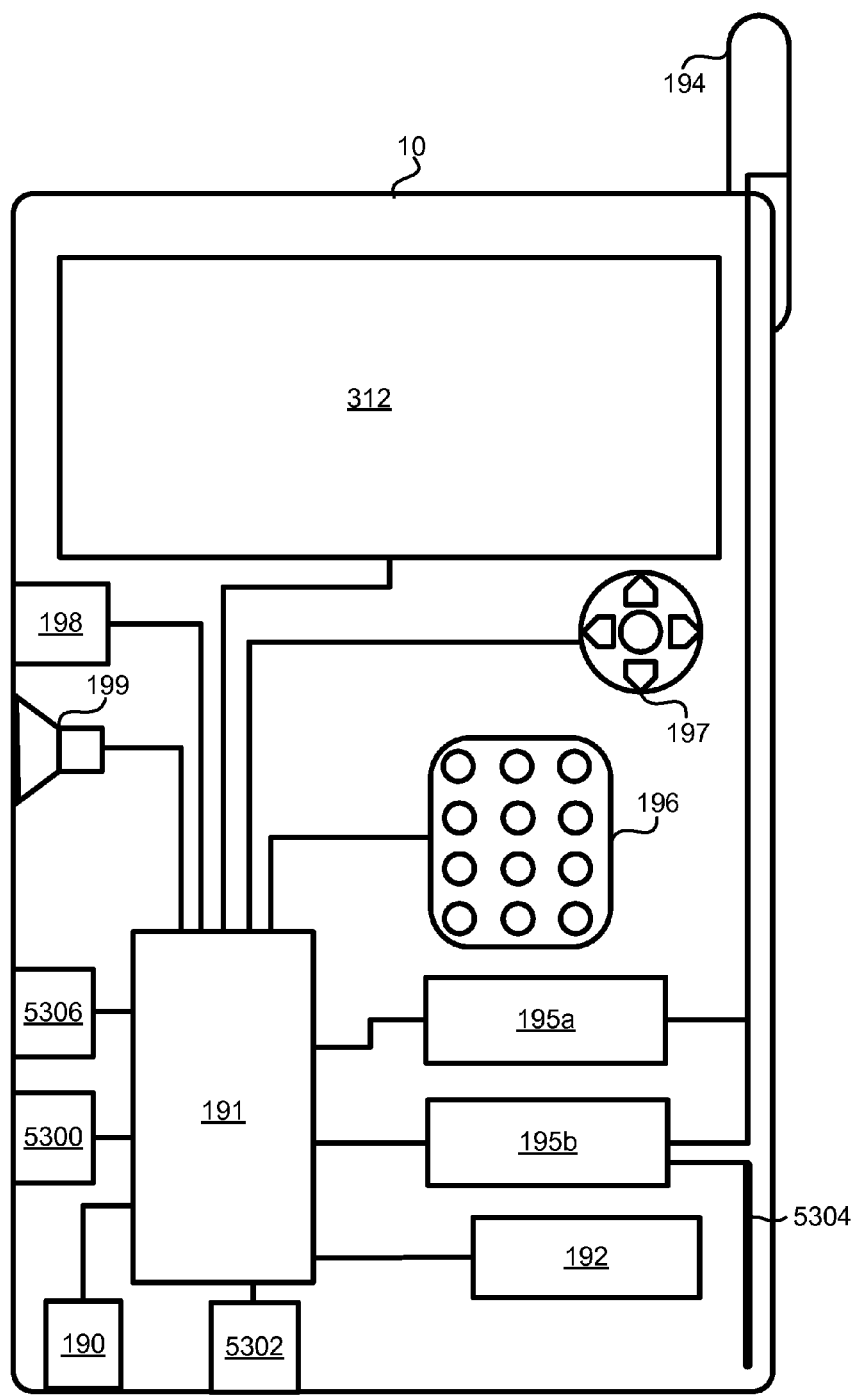
FIG. 24 is a component block diagram of an example portable computing device suitable for use with the various aspects.

The aspects described above may be implemented on any of a variety of portable computing devices 10. Typically, such portable computing devices 10 will have in common the components illustrated in FIG. 24. For example, the portable computing devices 10 may include a processor 191 coupled to internal memory 192 and a touch surface input device. The touch surface input device may be any type of touchscreen display 312, such as a resistive-sensing touchscreen, capacitive-sensing touchscreen, infrared sensing touchscreen, acoustic/piezoelectric sensing touchscreen or the like. The various aspects are not limited to any particular type of touchscreen display 312 or touchpad technology. Additionally, the portable computing device 10 may have an antenna 194 for sending and receiving electromagnetic radiation that is connected to one or more wireless transceivers 195$a$, 195$b$ coupled to the processor 191. For example, one wireless transceiver 195$a$ may be cellular telephone transceiver 195$a$ configured to establish a wireless communication link with a cellular telephone and data communication network, and another may be a Bluetooth® transceiver configured to establish wireless communication links with other Bluetooth® enabled computing devices. Portable computing devices 10 which do not include a touchscreen input device 312 typically include a key pad 196 or miniature keyboard and menu selection keys or rocker switches 197 which serve as pointing devices. The processor 191 may further be connected to a wired network interface 198, such as a universal serial bus (USB) or FireWire® connector socket, for connecting the processor 191 to an external touchpad or touch surfaces or external local area network. The computing device 10 may further include a microphone 199 coupled to the processor 191 to receive voice and commands from the user.

The computing device 10 may further include other circuit components and sensors to enable the file sharing functionality of the various aspects. An accelerometer sensor assembly 190 may be coupled to the processor 191 to detect acceleration of the computing device. Such an accelerometer sensor assembly 190 may include three accelerometers configured to sense accelerations along three mutually perpendicular directions. A gyroscope sensor 5300 may be coupled to the processor 191 to detect rapid rotational movements of the computing device 10. An electronic compass sensor 5302 may be coupled to the processor to detect the direction in which the computing device is pointing with respect to the Earth's magnetic field. In an aspect, the computing device 10 may also include a second antenna 5304 coupled to one of the wireless transceivers 195*b* to enable the transceiver 195*b* or processor to compare the timing and/or signal strength of signals received from nearly computing devices to support triangulation calculations. A GPS receiver 5306 may also be coupled to the processor 191 to determine the location of a computing device. In an aspect, the GPS receiver 5306 and the processor 191 may be configured to determine location using enhanced GPS services supported by a cellular telephone network.

In some implementations, a touch surface can be provided in areas of the computing device 10 outside of the touchscreen display 312. For example, the keypad 196 can include a touch surface with buried capacitive touch sensors. In other implementations, the keypad 196 may be eliminated so the touchscreen display 312 provides the complete GUI. In yet further implementations, a touch surface may be an external touchpad that can be connected to the computing device 10 by means of a cable to a cable connector 198 or a wireless transceiver 195*b* coupled to the processor 191.

The processor 191 may be any programmable microprocessor, microcomputer or multiple processor chip or chips that can be configured by software instructions (applications) to perform a variety of functions, including the functions of the various aspects described above. In some portable computing devices 10, multiple processors 191 may be provided, such as one processor dedicated to wireless communication functions and one processor dedicated to running other applications. The processor may also be included as part of a communication chipset. Typically, software applications may be stored in the internal memory 195 before they are accessed and loaded into the processor 191. In some portable computing devices 10, the processor 191 may include internal memory sufficient to store the application software instructions. For the purposes of this description, the term memory refers to all memory accessible by the processor 191, including internal memory 195 and memory within the processor 191 itself. Application data files are typically stored in the memory 195. In many portable computing devices 10, the memory 195 may be a volatile or nonvolatile memory, such as flash memory, or a mixture of both.

Those of skill in the art would appreciate that the various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a process are described and appear in the figures is for example purposes only as the order of some blocks may be changed from that described herein without changing the scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or computing device. In the alternative, the processor and the storage medium may reside as discrete components in a user terminal or computing device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for sharing files among a mobile device and nearby computing devices, comprising:
   activating a file sharing functionality;
   discovering nearby computing devices;
   establishing a wireless link with the discovered nearby computing devices;
   determining locations of the discovered nearby computing devices;
   displaying a radar map image including graphical indicators for the determined locations of the discovered nearby computing devices;
   detecting accelerations of the mobile device;
   identifying targeted computing devices based on the detected accelerations by:
      determining whether the mobile device completes a closed elliptical path based upon the detected accelerations; and
      identifying all computing devices proximate to the mobile device, regardless of proximity among the discovered nearby computing devices, as targeted computing devices when it is determined that the mobile device completes the closed elliptical path;
   determining a direction of rotation when the mobile device completes the closed elliptical path;
   transmitting a file sharing message to the targeted computing devices by:
      transmitting a file to the targeted computing devices when the mobile device is being moved in a first rotational direction; and
      transmitting a request for files to the targeted computing devices when the mobile device is being moved in a second rotational direction counter to the first rotational direction,
   wherein transmitting the file sharing message further comprises transmitting a selected file to the targeted computing devices by:

displaying a prompt for a user verification of the targeted computing devices, wherein displaying the prompt for the user verification of the targeted computing devices comprises:

receiving user identifiers from targeted computing devices via the established wireless link;

using the received user identifiers to obtain images from a contact database; and displaying obtained images as prompts for the user verification of the targeted computing devices; and determining whether a user input indicates user verification of the targeted computing devices, wherein transmitting the selected file to the targeted computing devices is accomplished when the user input indicates user verification of the targeted computing devices.

2. The method of claim 1, wherein establishing the wireless link is accomplished using a wireless technology selected from Bluetooth®, ZigBee®, Near Field Communication (NFC), wide-area-wireless IEEE 802.11 (WiFi), infrared (IrDA), and ultrasound.

3. The method of claim 2, wherein:

determining locations of the discovered nearby computing devices comprises receiving location coordinates provided by Global Positioning System (GPS) receivers in each of the discovered nearby computing devices via the established wireless link; and transmitting the file sharing message to the targeted computing devices is accomplished using a wireless technology different from the wireless technology used to establish the wireless link.

4. The method of claim 1, wherein determining locations of the discovered nearby computing devices comprises:

determining a difference in arrival times of signals received from the discovered nearby computing devices using a first and second antennae; and using triangulation calculations based on the determined difference in arrival times of signals to determine a direction to each of the discovered nearby computing devices.

5. The method of claim 1, wherein determining locations of the discovered nearby computing devices comprises:

receiving location coordinates provided by Global Positioning System (GPS) receivers in each of the discovered nearby computing devices; and comparing the received location coordinates to location coordinates from a GPS receiver within the mobile device.

6. The method of claim 1, wherein the first rotational direction is a clockwise direction; and the second rotational direction is a counterclockwise direction.

7. The method of claim 1, wherein the first rotational direction is a counterclockwise direction; and the second rotational direction is a clockwise direction.

8. The method of claim 1, further comprising:

transmitting a request to transmit a selected file to the targeted computing devices; and receiving a response from the targeted computing devices including access data specifying an address to which the selected file should be transmitted, wherein transmitting the selected file to the targeted computing devices comprises:

determining a wireless communication link over which the selected file should be transmitted based upon the address specified in the received access data; and transmitting the selected file to the address via the determined wireless communication link.

9. The method of claim 8, wherein the request to transmit the selected file to the targeted computing devices is accomplished using the established wireless link, and the determined wireless communication link used to transmit the selected file uses a wireless technology that is different than the established wireless link technology.

10. The method of claim 1, wherein transmitting a file sharing message comprises:

transmitting a message requesting the targeted computing devices to transmit a file; and transmitting access data to the targeted computing devices, the access data including an address to which the requested file should be transmitted.

11. A mobile device, comprising:

a processor;

a display coupled to the processor;

a touch sensitive surface coupled to the processor;

an accelerometer coupled to the processor and configured to sense accelerations of the mobile device;

a memory coupled to the processor; and a first wireless transceiver coupled to the processor, wherein the processor is configured with processor-executable instructions to perform operations comprising:

activating file sharing functionality;

discovering nearby computing devices via the first wireless transceiver;

establishing a wireless link with the discovered nearby computing devices via the first wireless transceiver;

determining locations of the discovered nearby computing devices;

displaying a radar map image on the display including graphical indicators for the determined locations of the discovered nearby computing devices;

receiving signals from the accelerometer indicating detected accelerations of the mobile device;

identifying targeted computing devices based on the detected accelerations, by:

determining whether the mobile device completes a closed elliptical path based upon the detected accelerations; and identifying all computing devices proximate to the mobile device, regardless of proximity among the discovered nearby computing devices, as targeted computing devices when it is determined that the mobile device completes the closed elliptical path;

determining a direction of rotation when the mobile device completes the closed elliptical path;

transmitting a file sharing message to the targeted computing devices via the first transceiver by:

transmitting a file to the targeted computing devices when the mobile device is being moved in a first rotational direction; and transmitting a request for files to the targeted computing devices when the mobile device is being moved in a second rotational direction counter to the first rotational direction, wherein transmitting the file sharing message further comprises transmitting a selected file to the targeted computing devices by:

displaying on the display a prompt for a user verification of the targeted computing devices, wherein displaying the prompt for the user verification of the targeted computing devices comprises:

receiving a user identifier from each targeted computing device via the established wireless link via the first transceiver;

using each received user identifier to obtain an image from a contact database stored in the memory; and displaying on the display each obtained image as the prompt for the user verification of each of the targeted computing devices; and determining whether a user input indicates user verification for each of the targeted computing devices, and the processor is further configured with processor-executable instructions such that transmitting the file to the targeted computing devices is accomplished when the user input indicates user verification of the targeted computing devices.

12. The mobile device of claim 11, wherein the first transceiver is configured to communicate according to a wireless technology selected from Bluetooth®, ZigBee®, Near Field Communication (NFC), wide-area-wireless IEEE 802.11 (WiFi), infrared (IrDA), and ultrasound.

13. The mobile device of claim 12, wherein the processor is further configured with processor-executable instructions such that:

determining locations of the discovered nearby computing devices is accomplished by receiving location coordinates provided by Global Positioning System (GPS) receivers in each of the discovered nearby computing devices via the established wireless link; and transmitting the file sharing message to the targeted computing devices is accomplished using a wireless technology different from the wireless technology used to establish the wireless link.

14. The mobile device of claim 11, further comprising:

a first antenna and a second antenna, at least one of which is coupled to the first transceiver, wherein the processor is further configured with processor-executable instructions such that determining locations of the discovered nearby computing devices is accomplished by performing operations comprising:

determining a difference in arrival times of signals received from the discovered nearby computing devices via the first and second antennae; and using triangulation calculations based on the determined difference in arrival times of signals to determine a direction to each of the discovered nearby computing devices.

15. The mobile device of claim 11, further comprising:

a Global Positioning System (GPS) receiver coupled to the processor, wherein the processor is further configured with processor-executable instructions such that determining locations of the discovered nearby computing devices is accomplished by performing operations comprising:

receiving location coordinates provided by GPS receivers in the discovered nearby computing devices; and comparing the received location coordinates to location coordinates received from the GPS receiver.

16. The mobile device of claim 11, wherein the processor is further configured with processor-executable instructions such that transmitting the file sharing message is accomplished by performing operations comprising:

transmitting, via the first transceiver, a request to transmit a selected file to the targeted computing devices;

receiving, via the first transceiver, a response from the targeted computing devices including access data specifying an address to which the selected file should be transmitted;

determining a wireless communication link over which the selected file should be transmitted based upon the address specified in the received access data; and transmitting the selected file to the address via the determined wireless communication link.

17. The mobile device of claim 16, wherein the processor is further configured with processor-executable instructions to perform operations further comprising:

transmitting the selected file to the targeted computing devices via the first transceiver.

18. The mobile device of claim 16, further comprising a second transceiver coupled to the processor, wherein the second transceiver is configured to communicate using a wireless communication technology different from that of the first transceiver, wherein the processor is configured with processor-executable instructions to perform operations further comprising:

transmitting the selected file via the second transceiver.

19. The mobile device of claim 11, wherein the processor is further configured with processor-executable instructions such that transmitting the file sharing message is accomplished by performing operations comprising:

transmitting a message requesting the targeted computing devices to transmit a file; and transmitting access data to the targeted computing devices, the access data including an address to which the requested file should be transmitted.

20. The mobile device of claim 11, wherein the first rotational direction is a clockwise direction; and the second rotational direction is a counterclockwise direction.

21. The mobile device of claim 11, wherein the first rotational direction is a counterclockwise direction; and the second rotational direction is a clockwise direction.

22. A mobile device, comprising:

means for activating a file sharing functionality;

means for discovering nearby computing devices;

means for establishing a wireless link with the discovered nearby computing devices;

means for determining locations of the discovered nearby computing devices;

means for displaying a radar map image including graphical indicators for the determined locations of the discovered nearby computing devices;

means for detecting accelerations of the mobile device;

means for identifying targeted computing devices based on the detected accelerations, wherein means for identifying the targeted computing devices based on the detected accelerations comprises:

means for determining whether the mobile device completes a closed elliptical path based upon the detected accelerations; and means for identifying all computing devices proximate to the mobile device, regardless of proximity among the discovered nearby computing devices, as targeted computing devices when it is determined that the mobile device completes the closed elliptical path;

means for determining a direction of rotation when the mobile device completes the closed elliptical path;

means for transmitting a file sharing message to the targeted computing devices comprising:

means for transmitting a file to the targeted computing devices when the mobile device is being moved in a first rotational direction; and means for transmitting a request for files to the targeted computing devices when the mobile device is being moved in a second rotational direction counter to the first rotational direction;

means for displaying a prompt for a user verification of the targeted computing devices, wherein means for displaying the prompt for the user verification of the targeted computing devices comprises:

means for receiving user identifiers from targeted computing devices via the established wireless link;

means for using the received user identifiers to obtain images from a contact database; and means for displaying obtained images as prompts for the user verification of the targeted computing devices; and means for determining whether a user input indicates user verification of the targeted computing devices, wherein means for transmitting the selected file to the targeted computing devices comprises means for transmitting the selected file to the targeted computing devices when the user input indicates user verification of the targeted computing devices.

23. The mobile device of claim 22, wherein means for establishing the wireless link uses a wireless technology selected from Bluetooth®, ZigBee®, Near Field Communication (NFC), wide-area-wireless IEEE 802.11 (WiFi), infrared (IrDA), and ultrasound.

24. The mobile device of claim 23, wherein:

means for determining locations of the discovered nearby computing devices comprises means for receiving location coordinates provided by Global Positioning System (GPS) receivers in each of the discovered nearby computing devices via the established wireless link; and means for transmitting the file sharing message to the targeted computing devices comprises means for transmitting the file sharing message using a wireless technology different from the wireless technology used by the means for establishing the wireless link.

25. The mobile device of claim 22, wherein means for determining locations of the discovered nearby computing devices comprises:

means for determining a difference in arrival times of signals received from the discovered nearby computing devices using a first and second antennae; and means for using triangulation calculations based on the determined difference in arrival times of signals to determine a direction to each of the discovered nearby computing devices.

26. The mobile device of claim 22, wherein means for determining locations of the discovered nearby computing devices comprises:

means for receiving location coordinates provided by Global Positioning System (GPS) receivers in each of the discovered nearby computing devices; and means for comparing the received location coordinates to location coordinates from a GPS receiver.

27. The mobile device of claim 22, wherein the first rotational direction is a clockwise direction; and the second rotational direction is a counterclockwise direction.

28. The mobile device of claim 22, wherein the first rotational direction is a counterclockwise direction; and the first rotational direction is a clockwise direction.

29. The mobile device of claim 22, further comprising:

means for transmitting a request to transmit a selected file to the targeted computing devices; and means for receiving a response from the targeted computing devices including access data specifying an address to which the selected file should be transmitted, wherein means for transmitting the selected file to the targeted computing devices comprises:

means for determining a wireless communication link over which the file should be transmitted based upon the address specified in the received access data; and means for transmitting the selected file to the address via the determined wireless communication link.

30. The mobile device of claim 29, wherein:

means for transmitting the request to transmit the selected file to the targeted computing devices comprises means for transmitting the request using the established wireless link, and means for transmitting the selected file via the determined wireless communication link uses a wireless technology that is different than the established wireless link technology.

31. The mobile device of claim 22, wherein means for transmitting the file sharing message comprises:

means for transmitting a message requesting the targeted computing devices to transmit a file; and means for transmitting access data to the targeted computing devices, the access data including an address to which the requested file should be transmitted.

32. A non-transitory, computer-readable medium having stored thereon processor-executable instructions configured to cause a processor to perform operations comprising:

activating a file sharing functionality;

discovering nearby computing devices;

establishing a wireless link with the discovered nearby computing devices;

determining locations of the discovered nearby computing devices;

displaying a radar map image including graphical indicators for the determined locations of the discovered nearby computing devices;

detecting accelerations of the mobile device;

identifying targeted computing devices based on the detected accelerations by:

determining whether the mobile device completes a closed elliptical path based upon the detected accelerations; and identifying all computing devices proximate to the mobile device, regardless of proximity among the discovered nearby computing devices, as targeted computing devices when it is determined that the mobile device completes the closed elliptical path;

determining a direction of rotation when the mobile device completes the closed elliptical path;

transmitting a file sharing message to the targeted computing devices by:

transmitting a file to the targeted computing devices when the mobile device is being moved in a first rotational direction; and transmitting a request for files to the targeted computing devices when the mobile device is being moved in a second rotational direction counter to the first rotational direction, wherein the processor-executable instructions for transmitting the file sharing message further comprises processor-executable instructions configured for transmitting a selected file to the targeted computing devices by:

displaying a prompt for a user verification of the targeted computing devices, wherein displaying the prompt for the user verification of the targeted computing devices comprises:
  receiving user identifiers from targeted computing devices via the established wireless link;
  using the received user identifiers to obtain images from a contact database; and
  displaying obtained images as prompts for the user verification of the targeted computing devices; and
determining whether a user input indicates user verification of the targeted computing devices, wherein the stored processor-executable instructions are configured to cause the processor to perform operations such that transmitting the file to the targeted computing device comprises transmitting the selected file when the user input indicates user verification of the targeted computing devices.

33. The non-transitory computer-readable medium of claim 32, wherein the stored processor-executable instructions are configured to cause the processor to perform operations further comprising using a wireless technology selected from Bluetooth®, ZigBee®, Near Field Communication (NFC), wide-area-wireless IEEE 802.11 (WiFi), infrared (IrDA), and ultrasound to establish the wireless link.

34. The non-transitory computer-readable medium of claim 33, wherein the stored processor-executable instructions to determine locations of the discovered nearby computing devices cause the processor to perform operations such that determining locations of the discovered nearby computing devices comprises:
  receiving location coordinates provided by Global Positioning System (GPS) receivers in each of the discovered nearby computing devices via the established wireless link; and
  using a wireless technology to transmit the file sharing message to the targeted computing devices that is different from the wireless technology used to establish the wireless link.

35. The non-transitory computer-readable medium of claim 32, wherein the stored processor-executable instructions to determine locations of the discovered nearby computing devices cause the processor to perform operations such that determining locations of the discovered nearby computing device comprises:
  determining a difference in arrival times of signals received from the discovered nearby computing devices using a first and second antennae; and
  using triangulation calculations based on the determined difference in arrival times of signals to determine a direction to each of the discovered nearby computing devices.

36. The non-transitory computer-readable medium of claim 32, wherein the stored processor-executable instructions to determine locations of the discovered nearby computing devices cause the processor to perform operations such that determining locations of the discovered nearby computing device comprises:
  receiving location coordinates provided by Global Positioning System (GPS) receivers in each of the discovered nearby computing devices; and
  comparing the received location coordinates to location coordinates from a GPS receiver.

37. The non-transitory computer-readable medium of claim 32, wherein the first rotational direction is a clockwise direction; and
  the second rotational direction is a counterclockwise direction.

38. The non-transitory computer-readable medium of claim 32, wherein the first rotational direction is a counterclockwise direction; and
  the second rotational direction is a clockwise direction.

39. The non-transitory computer-readable medium of claim 32, wherein the stored processor-executable instructions are configured to cause the processor to perform operations such that transmitting a file sharing message comprises transmitting a selected file to the targeted computing devices, wherein the stored processor-executable instructions are configured to cause the processor to perform operations further comprising:
  transmitting a request to transmit the selected file to the targeted computing devices; and
  receiving a response from the targeted computing devices including access data specifying an address to which the selected file should be transmitted,
  wherein the stored processor-executable instructions are configured to cause the processor to perform operations such that transmitting the selected file to the targeted computing devices comprises:
    determining a wireless communication link over which the selected file should be transmitted based upon the address specified in the received access data; and
    transmitting the selected file to the address via the determined wireless communication link.

40. The non-transitory computer-readable medium of claim 39, wherein the stored processor-executable instructions are configured to cause the processor to perform operations such that transmitting a request to transmit the file to the targeted computing device comprises:
  transmitting the request to transmit the file using the established wireless link; and
  transmitting the selected file using a wireless technology that is different than the established wireless link technology.

41. The non-transitory computer-readable medium of claim 32, wherein the stored processor-executable instructions are configured to cause the processor to perform operations such that transmitting a file sharing message comprises:
  transmitting a message requesting the targeted computing devices to transmit a file; and
  transmitting access data to the targeted computing devices, the access data including an address to which the requested file should be transmitted.

* * * * *